(12) United States Patent
Yoshida et al.

(10) Patent No.: US 12,386,282 B2
(45) Date of Patent: Aug. 12, 2025

(54) MAGNETIC CARRIER, TWO-COMPONENT DEVELOPER, AND DEVELOPER FOR REPLENISHMENT

(71) Applicant: CANON KABUSHIKI KAISHA, Tokyo (JP)

(72) Inventors: Nobuhiro Yoshida, Chiba (JP); Hironori Minagawa, Ibaraki (JP); Yuzo Tokunaga, Chiba (JP); Nobuyoshi Sugahara, Tokyo (JP); Yuu Nishimura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 17/581,717

(22) Filed: Jan. 21, 2022

(65) Prior Publication Data

US 2022/0236659 A1    Jul. 28, 2022

(30) Foreign Application Priority Data

Jan. 25, 2021    (JP) .................................. 2021-009915

(51) Int. Cl.
| | |
|---|---|
| *G03G 9/107* | (2006.01) |
| *C08F 220/22* | (2006.01) |
| *G03G 9/113* | (2006.01) |
| *G03G 15/08* | (2006.01) |

(52) U.S. Cl.
CPC .......... *G03G 9/1134* (2013.01); *C08F 220/22* (2013.01); *G03G 9/1085* (2020.08); *G03G 15/0855* (2013.01); *G03G 15/0865* (2013.01)

(58) Field of Classification Search
None
See application file for complete search history.

(56) References Cited

U.S. PATENT DOCUMENTS

2008/0102396 A1* 5/2008 Fukushima .......... G03G 9/0819
399/130

FOREIGN PATENT DOCUMENTS

| JP | 63235963 A | | 9/1988 |
| JP | H0815986 A | * | 1/1996 |
| JP | H08272148 A | * | 10/1996 |
| JP | H09244303 A | | 9/1997 |
| JP | H1055109 A | | 2/1998 |

(Continued)

OTHER PUBLICATIONS

JP-H08272148-A Translation (Year: 2024).*
JP-H0815986-A Translation (Year: 2024).*
JP-2007316332-A Translation (Year: 2024).*

*Primary Examiner* — Mark F. Huff
*Assistant Examiner* — Charles Collins Sullivan, IV
(74) *Attorney, Agent, or Firm* — Canon U.S.A., Inc. IP Division

(57) ABSTRACT

A magnetic carrier, which is suppressed from causing the loss and wear of a magnetic carrier coating resin even when used for a long time period, and achieves a stable image density and a reduction in toner scattering. In the magnetic carrier, the resin coating layer contains a resin A having a fluorine polymer moiety, the resin coating layer has an average thickness of 50 nm or more, a ratio $F(x)$ (atomic %) of a fluorine atom detected at a position at a depth of x nm from a surface of a magnetic carrier particle by X-ray photoelectron spectroscopy satisfies formula (1) and formula (2), and when x represents an integer of 0 or more and 20 or less, $F(x)$ satisfies formula (3):

$$5.0 \leq F(0) \leq 15 \quad (1)$$

$$F(20) \leq 5.0 \quad (2)$$

$$|F(x+1) - F(x)| \leq 7.5 \quad (3).$$

10 Claims, 4 Drawing Sheets

(56) References Cited

FOREIGN PATENT DOCUMENTS

| | | | |
|---|---|---|---|
| JP | 2001066826 A | | 3/2001 |
| JP | 2004126623 A | | 4/2004 |
| JP | 2007316332 A | * | 12/2007 |
| JP | 2011033861 A | | 2/2011 |

* cited by examiner

MAGNETIC CARRIER, TWO-COMPONENT DEVELOPER, AND DEVELOPER FOR REPLENISHMENT

BACKGROUND OF THE INVENTION

Field of the Invention

The present disclosure relates to a magnetic carrier, a two-component developer, and a developer for replenishment to be used in an image-forming method for visualizing an electrostatic image by employing an electrophotographic method.

Description of the Related Art

In general, the following method has heretofore been employed as an image-forming method of an electrophotographic system. An electrostatic latent image is formed on an electrostatic latent image-bearing member with various units and then toner is caused to adhere to the electrostatic latent image to develop the electrostatic latent image. At the time of the development, the following two-component development system has been widely adopted. A carrier particle called a magnetic carrier is mixed with the toner, the toner is provided with a proper quantity of positive or negative charge by subjecting the mixture to triboelectric charging, and the development is performed with the charge as a driving force.

The two-component development system has an advantage, such as good controllability of the performance of a developer, because of the following reason. The system can impart functions, such as the stirring, conveyance, and charging of the developer, to the magnetic carrier, and hence functions are clearly shared between the carrier and the toner. Herein, the magnetic carrier often includes a magnetic core for imparting magnetism to the carrier to obtain conveyability and a coating resin for coating the magnetic core to cause the carrier to obtain an ability to impart charge to the toner.

In recent years, along with the technological advance of an electrophotographic field, the long lifetime of the main body of an electrophotographic apparatus has been required at a higher level, and hence the magnetic carrier is required to maintain its charge-imparting ability even when used for a long time period. It has been known that when the magnetic carrier is used for a long time period, a toner component generally adheres to the surface of the magnetic carrier, and hence the charge-imparting ability of the magnetic carrier is reduced by a reduction in number of charging sites, thereby causing a harmful effect on an image, such as a change in tinge.

As a method of obtaining a durable characteristic against the adhesion of the toner component described above (hereinafter sometimes referred to as "contamination resistance"), there is a disclosure of an example in which a fluorine resin, which is a material having low surface free energy, or the like is used as the coating resin (Japanese Patent Application Laid-Open No. S63-235963).

In general, a material having low surface free energy, such as the fluorine resin, can suppress the adhesion of the toner component or the like. However, the material has such a property as to be liable to be broken by an external force or the like because an interaction between its molecules is weak. In addition, the material having low surface free energy, such as the fluorine resin, has low adhesiveness with each of many other materials, and has so low an affinity for each of the materials as to be hardly mixed therewith. Accordingly, when the material having low surface free energy is used in combination with a general resin, such as an acrylic resin, a boundary surface between the components occurs, and interlayer peeling starting from the interface is liable to occur. Accordingly, when the fluorine resin is used as the coating resin of the magnetic carrier, the coating resin may be worn or lost by, for example, a mechanical load occurring at the time of, for example, the stirring or conveyance of the carrier in a developing unit. In addition, the charge-imparting ability of the magnetic carrier has reduced as a result of a reduction in surface resistance of the magnetic carrier in some cases (Japanese Patent Application Laid-Open No. 2001-66826).

To obtain a durable characteristic against the above-mentioned event, such as the wear or loss of the coating resin layer (hereinafter sometimes referred to as "wear resistance"), an example in which a fluorine-modified resin having a trifluoromethyl group bonded to a terminal thereof is used is conceivable. However, it has been found that the structure has insufficient contamination resistance because the structure cannot sufficiently reduce the surface free energy of the surface of the magnetic carrier. Meanwhile, in the case where a resin having a fluoroalkyl structure in a side chain thereof is used as a structure for further reducing the surface free energy, surface free energy between its molecules reduces. It has been recognized that as in the case where the above-mentioned fluorine-modified resin is used, the wear resistance becomes insufficient as a result of the reduction (Japanese Patent Application Laid-Open No. H10-55109).

That is, to achieve a highly stable magnetic carrier, both of the contamination resistance by which the adhesion of the toner component is suppressed and the wear resistance by which the wear of the coating resin layer due to a mechanical load or the like is suppressed are required to be obtained simultaneously.

SUMMARY OF THE INVENTION

In view of the foregoing, an aspect of the present disclosure is to provide a magnetic carrier, which is suppressed from causing the loss and wear of a magnetic carrier coating resin even when used for a long time period, and achieves a stable image density and a reduction in toner scattering.

The inventors of the present disclosure have made extensive investigations, and as a result, have found that the use of a magnetic carrier satisfying a specific parameter can achieve both of excellent contamination resistance and excellent wear resistance for the magnetic carrier.

According to one embodiment of the present disclosure, there is provided a magnetic carrier including a magnetic carrier particle including a magnetic core and a resin coating layer configured to coat a surface of the magnetic core, wherein the resin coating layer contains a resin A having a fluorine polymer moiety, wherein the resin coating layer has an average thickness of 50 nm or more, wherein when a concentration of a nitrogen atom, a concentration of a silicon atom, a concentration of a fluorine atom, a concentration of a carbon atom, a concentration of a titanium atom, a concentration of a strontium atom, a concentration of a tin atom, a concentration of an aluminum atom, and a concentration of an oxygen atom detected at a position at a depth of x nm from a surface of the magnetic carrier particle by X-ray photoelectron spectroscopy are represented by $dN(x)$, $dSi(x)$, $dF(x)$, $dC(x)$, $dTi(x)$, $dSr(x)$, $dSn(x)$, $dAl(x)$, and $dO(x)$, respectively, a ratio $F(x)$ (atomic %) of the fluorine atom represented by equation (A) satisfies formula (1) and formula (2), and wherein when x represents an integer of 0 or more and 20 or less, F(x) satisfies formula (3).

$$F(x)=dF(x)/[dN(x)+dSi(x)+dF(x)+dC(x)+dTi(x)+dSr(x)+dSn(x)+dAl(x)+dO(x)]\times 100 \quad (A)$$

$$5.0 \leq F(0) \leq 15 \quad (1)$$

$$F(20) \leq 5.0 \quad (2)$$

$$|F(x+1)-F(x)| \leq 7.5 \quad (3).$$

In addition, according to another embodiment of the present disclosure, there is provided a two-component developer including the magnetic carrier.

In addition, according to another embodiment of the present disclosure, there is provided a developer for replenishment including the magnetic carrier.

Further features of the present disclosure will become apparent from the following description of exemplary embodiments with reference to the attached drawings.

DESCRIPTION OF THE EMBODIMENTS

Figure 1:
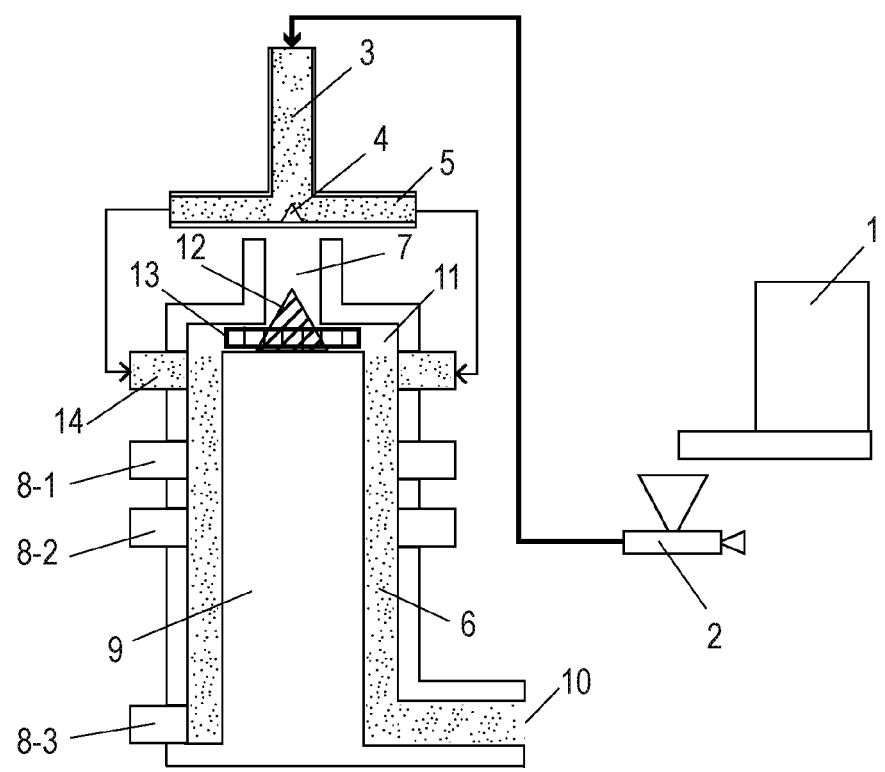
FIG. 1 is a schematic view of a surface treatment apparatus for treating the surface of a toner used in the present disclosure.

In the present disclosure, the description "○○ or more and xx or less" or "from ○○ to xx" representing a numerical range means a numerical range including a lower limit and an upper limit that are end points unless otherwise stated.

A magnetic carrier according to the present disclosure includes a magnetic carrier particle including a magnetic core and a resin coating layer configured to coat a surface of the magnetic core.

The resin coating layer contains a resin A having a fluorine polymer moiety. The resin coating layer has an average thickness of 50 nm or more.

When a concentration of a nitrogen atom, a concentration of a silicon atom, a concentration of a fluorine atom, a concentration of a carbon atom, a concentration of a titanium atom, a concentration of a strontium atom, a concentration of a tin atom, a concentration of an aluminum atom, and a concentration of an oxygen atom detected at a position at a depth of "x" nm from a surface of the magnetic carrier particle by X-ray photoelectron spectroscopy (XPS) are represented by dN(x), dSi(x), dF(x), dC(x), dTi(x), dSr(x), dSn(x), dAl(x), and dO(x), respectively, a ratio F(x) (atomic %) of the fluorine atom is represented by the following equation (A).

$$F(x)=dF(x)/[dN(x)+dSi(x)+dF(x)+dC(x)+dTi(x)+dSr(x)+dSn(x)+dAl(x)+dO(x)]\times 100 \quad (A)$$

At this time, F(0) satisfies the following formula (1), and F(20) satisfies the following formula (2).

$$5.0 \leq F(0) \leq 15 \quad (1)$$

$$F(20) \leq 5.0 \quad (2)$$

Further, when the "x" represents an integer of 0 or more and 20 or less, the F(x) satisfies the following formula (3) for any "x".

$$|F(x+1)-F(x)| \leq 7.5 \quad (3).$$

The inventors of the present disclosure have assumed the reason why in the case where the above-mentioned requirements are satisfied, the loss and wear of the coating resin of the magnetic carrier are suppressed even when the carrier is used for a long time period, and a stable image density and a reduction in toner scattering can be achieved to be as described below.

As represented by the formula (1), when a fluorine atom abundance ratio in the outermost surface layer of the magnetic carrier particle is 5.0% or more, the surface free energy of the surface of the magnetic carrier particle can be reduced. As a result, a toner component, such as a wax, hardly adheres to the surface of the magnetic carrier, and hence the contamination resistance of the carrier is improved.

Meanwhile, as represented by the formula (1), when the fluorine atom abundance ratio in the outermost surface layer of the magnetic carrier particle is 15% or less, the mechanical strength of the outermost surface of the coating resin is improved. As a result, the wear and loss of the resin coating layer are suppressed, and hence the wear resistance of the carrier is improved.

Meanwhile, as represented by the formula (2), when a fluorine atom abundance ratio at a depth of 20 nm is a certain value or less, the intermolecular force of the resin coating layer of the magnetic carrier can be improved, and hence the wear resistance is improved.

Further, as represented by the formula (3), when the range of a fluctuation in fluorine atom abundance ratio in a depth direction interval having a width of 1 nm is a certain value or less, no interface is present between the components of the carrier. Accordingly, the peeling of the resin coating layer starting from such interface is suppressed, and hence the wear resistance is further improved.

Accordingly, the inventors have assumed that when all of those formulae (1) to (3) are satisfied, both of the wear resistance and the contamination resistance can be achieved.

The resin A is not particularly limited as long as the resin A is a resin satisfying the above-mentioned formulae (1) to (3), and, for example, the following resins may be used: a resin formed of a fluoroalkyl group or a fluoro(poly)ether group (hereinafter sometimes simply referred to as "fluorine-based functional group"), a resin (such as an acrylic resin, a urethane resin, polyethylene, polyethylene terephthalate, polystyrene, or a phenol resin) modified with a fluorine-based functional group.

In addition, the magnetic carrier according to the present disclosure preferably satisfies the following requirements.

When the ratio C(x) (atomic %) of the carbon atom is represented by the following equation (B), the ratio "F(0)/C(0)" satisfies the following formula (4), and the ratio "F(20)/C(20)" satisfies the following formula (5).

$$C(x)=dC(x)/[dN(x)+dSi(x)+dF(x)+dC(x)+dTi(x)+dSr(x)+dSn(x)+dAl(x)+dO(x)]\times 100 \quad (B)$$

$$0.060 \leq F(0)/C(0) \leq 0.30 \quad (4)$$

$$F(20)/C(20) \leq 0.060 \quad (5)$$

In addition, it is preferred that when the "x" represents an integer of 0 or more and 20 or less, the F(x) and the C(x) satisfy the following formula (6) for any "x".

$$|F(x+1)/C(x+1)-F(x)/C(x)|\leq 0.15 \quad (6)$$

As represented by the formula (4), the ratio of the fluorine atom to the carbon atom in the outermost surface layer of the magnetic carrier particle detected by the X-ray photoelectron spectroscopy is preferably 0.060 or more. This is because a functional group derived from the fluorine atom in the coating resin contributes to a reduction in surface free energy of the magnetic carrier in the vicinity of its surface layer.

In addition, as represented by the formula (4), the ratio is preferably 0.30 or less because the mechanical strength of the surface of the resin coating layer is improved.

In addition, as represented by the formula (5), the ratio of the fluorine atom to the carbon atom detected by the X-ray photoelectron spectroscopy is preferably low at a depth of 20 nm from the outermost surface of the magnetic carrier particle. This is because a reduction in intermolecular force between molecules in the coating resin by the functional group derived from the fluorine atom in the coating resin can be suppressed.

In addition, what the formula (6) means is that the range of a fluctuation in fluorine atom abundance ratio with respect to the carbon atom in a depth direction interval having a width of 1 nm is a certain value or less. This case is preferred because no interface is present between the components of the magnetic carrier, and hence the wear resistance is further improved.

In addition, it is preferred that the F(x) satisfy the following formula (7).

$$F(10)\leq 8.0 \quad (7)$$

That is, the formula means that the amount of the fluorine atom at a position distant from the surface of the magnetic carrier by 10 nm in its depth direction is small. In this case, the wear resistance is further improved.

The content of the resin A in the resin coating layer is preferably 1.0 mass % or more and 50 mass % or less. This is because when the resin A is incorporated at 1.0 mass % or more into the resin coating layer, the surface free energy of the magnetic carrier particle can be sufficiently reduced, and when the content of the resin A in the resin coating layer is 50 mass % or less, the mechanical strength of the resin coating layer is improved.

The resin A preferably has a first repeating structure represented by the following formula (8). The resin preferably has the first repeating structure because the first repeating structure has a fluorine-modified moiety, and the structure reduces the surface free energy of the resin coating layer to improve the contamination resistance.

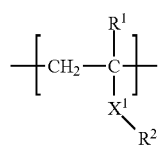

formula (8)

In the formula (8), $R^1$ represents hydrogen or a methyl group, $X^1$ represents COO or O, and $R^2$ represents an alkyl group having 1 to 20 carbon atoms or a (poly)ether group.

Part or all of the hydrogen atoms of the alkyl group or the (poly)ether group are each substituted with a fluorine atom.

When part of the hydrogen atoms are each substituted with a fluorine atom, part of the remaining hydrogen atoms may each be substituted with a halogen atom except a fluorine atom.

The ratio of the number of fluorine atoms to the sum of the number of hydrogen atoms, the number of the fluorine atoms, and the number of halogen atoms except the fluorine atoms in the alkyl group or the (poly)ether group is 5.0 atomic % or more, and the ratio of the number of the halogen atoms except the fluorine atoms to the sum is 40 atomic % or less.

As a specific approach to introducing the first repeating structure, there is given, for example, the copolymerization of an acrylate or methacrylate esterified by a primary alcohol part or all of the hydrogen atoms of which are each substituted with a fluorine atom at the time of the polymerization of the resin A.

The ratio of the resin A in the coating resin is preferably from 1 part by mass to 50 parts by mass. The ratio is preferably 1 part by mass or more because a reduction in surface free energy of the resin more easily occurs, and hence the contamination resistance is improved. The ratio is preferably 50 parts by mass or less because a reduction in intermolecular force of the resin A resulting from the low surface free energy of the resin A itself can be suppressed, and hence the wear resistance is improved. The ratio more preferably falls within the range of from 3 parts by mass to 20 parts by mass.

The first repeating structure preferably has any one of structures represented by the following formulae (8-1) to (8-4) from the viewpoint that both of the contamination resistance and the wear resistance can be achieved.

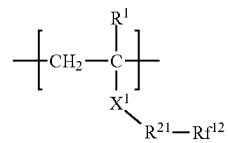

formulae (8-1)

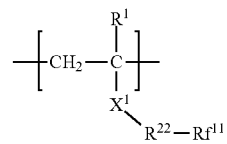

formulae (8-2)

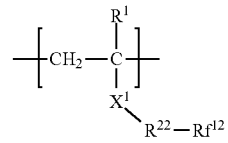

formulae (8-3)

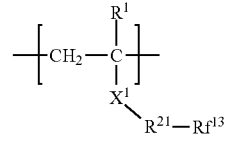

formulae (8-4)

In the formulae (8-1) to (8-4), $R^1$ represents hydrogen or a methyl group, $X^1$ represents COO or O, $R^{21}$ represents a single bond or an alkylene group, $R^{22}$ represents an alkylene group having tertiary carbon, $Rf^{11}$ represents a monovalent group having at least a fluoroalkyl group, $Rf^{12}$ represents a fluoroalkyl group having tertiary carbon or quaternary carbon, and $Rf^{13}$ represents a perfluoroalkyl group having 4 to 6 carbon atoms.

In addition, the resin A preferably has a second repeating structure represented by the following formula (9) because its wear resistance-improving effect becomes larger.

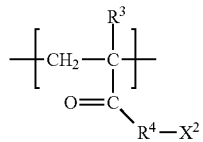

formula (9)

In the formula (9), $R^3$ represents H or a methyl group, and $R^4$ represents a divalent organic group. Although the structure of the divalent organic group is not particularly limited, a structure, such as O, COO, or COOY, may be utilized, and Y may adopt such a structure as represented by the following formula (Y1).

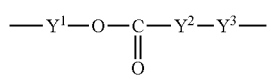

formula (Y1)

In the formula (Y1), $Y^1$ and $Y^2$ each independently represent an alkylene group, and part of the hydrogen atoms of the alkylene group may each be substituted with a hydroxy group or a halogen, and $Y^3$ represents O or S.

In the formula (9), $X^2$ represents a hydrocarbon group having 1 to 12 carbon atoms, or a polymer containing, as a polymerization component, at least one kind of compound selected from the group consisting of: an acrylate; a methacrylate; styrene; and acrylonitrile.

When the mass of the resin A in the coating resin is represented by X, the mass of the first repeating structure is represented by "a", and the mass of the second repeating structure is represented by "b", as the value of R represented by the following equation becomes larger, a larger wear resistance-improving effect can be obtained in the resin A.

$R=b/(X-a)$

What the R means is the ratio of the second repeating structure in a moiety in the resin A excluding the first repeating structure. The value of the R is preferably 0.5 or more because a large wear resistance-improving effect is obtained. Further, the value of the R is particularly preferably 0.95 or more.

The resin A may have a functional group, such as a nitrogen-containing group, a carboxyl group, or a hydroxy group. The presence of such functional group can suppress the charge-up of a developer particularly under a low-humidity environment. In addition, the resin preferably has a hydroxyl value because an effect by a hydrogen bond is exhibited, and hence the wear resistance is further improved. The acid value of the resin A when a carboxyl group is used preferably falls within the range of from 5 mgKOH/g to 100 mgKOH/g. When the acid value is 5 mgKOH/g or more, the charge-up is alleviated, and when the acid value is 100 mgKOH/g or less, the charge retentivity of the developer is improved. The hydroxyl value of the resin A when a hydroxy group is used preferably falls within the range of from 5 mgKOH/g to 50 mgKOH/g. When the hydroxyl value is 5 mgKOH/g or more, the charge-up is alleviated, and when the hydroxyl value is 50 mgKOH/g or less, the charge retentivity of the developer is improved.

The resin coating layer preferably contains a resin B having a third repeating structure represented by the following formula (10) because the wear resistance is further improved.

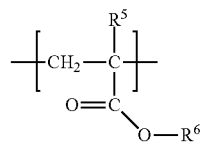

formula (10)

In the formula (10), $R^5$ represents hydrogen or a methyl group, and $R^6$ represents a hydrocarbon group having 1 to 12 carbon atoms.

As a specific approach to introducing the third repeating structure, there is given, for example, the copolymerization of any one of the following monomers at the time of the polymerization of the resin B: methyl acrylate, ethyl acrylate, propyl acrylate, butyl acrylate, hexyl acrylate, decyl acrylate, dodecyl acrylate, cyclobutyl acrylate, cyclohexyl acrylate, cyclopentyl acrylate, cyclooctyl acrylate, methyl methacrylate, ethyl methacrylate, propyl methacrylate, butyl methacrylate, hexyl methacrylate, dodecyl methacrylate, cyclobutyl methacrylate, cyclohexyl methacrylate, cyclopentyl methacrylate, and cyclooctyl methacrylate.

When the SP value of the second repeating structure of the resin A is represented by $SPa_2$ and the SP value of the third repeating structure of the resin B is represented by $SPb_3$, the $SPa_2$ and the $SPb_3$ preferably satisfy the following formula.

$|SPa_2-SPb_3| \leq 2.5$

The relational expression is preferably satisfied because compatibility between the resin A and the resin B becomes higher to improve the wear resistance. As the value of the difference $|SPa_2-SPb_3|$ becomes smaller, an intermolecular force acting between the second repeating structure and the third repeating structure becomes stronger, and hence a larger wear resistance-improving effect can be obtained. Only one kind of structure may be incorporated as the third repeating structure, or two or more kinds of structures may be incorporated.

The content of the resin B is preferably as large as possible to the extent that the formulae (1) to (3) are satisfied because a larger wear resistance-improving effect can be obtained. In particular, the content of the resin B is preferably 50 mass % or more, more preferably 90 mass % or more with respect to the entirety of the coating resin.

When $R^6$ in the formula (10) contains an alicyclic hydrocarbon group, the surface (coating film surface) of the resin coating layer configured to coat the surface of the magnetic core becomes smoother, and hence the adhesion of a toner or a toner-derived component, such as an external additive for imparting flowability to the toner, can be suppressed. Further, $R^6$ preferably contains the alicyclic hydrocarbon group because the alicyclic hydrocarbon group serves to suppress the agglomeration of the fluorine-based functional groups in the resin A to aid the orientation of the fluorine-based functional groups toward the surface, and hence the contamination resistance is further improved.

The acid value of the resin B is preferably 0 mgKOH/g or more and 3.0 mgKOH/g or less, more preferably 0 mgKOH/g or more and 2.8 mgKOH/g or less, still more preferably 0 mgKOH/g or more and 2.5 mgKOH/g or less. When the acid value of the resin B is 3.0 mgKOH/g or less, the self-agglomeration of the resin due to an influence of the acid value hardly occurs, and hence the smoothness of the surface (coating film surface) of the resin coating layer hardly reduces. The acid value of the resin B may be controlled by: using a monomer having a polar group, such as a carboxy group or a sulfo group (sulfonic acid group), at the time of the synthesis of the resin B; and adjusting the addition amount of the monomer. However, it is preferred that the monomer having a polar group be not used because the acid value is preferably low. Even when the resin is synthesized by using only a monomer for forming an ester bond, an acid value may slightly occur in the resin to be synthesized. This is probably because part of the ester bonds decompose to produce a carboxy group at the time of the synthesis (polymerization) of the resin.

In addition, the average layer thickness of the resin coating layer containing the resin A and the resin B is preferably 50 nm or more and 3,000 nm or less from the viewpoint that both of the durability and electrical resistance of the layer can be achieved.

The resin coating layer of the present disclosure preferably contains conductive fine particles in its coating resin. The conductive fine particles can appropriately control the specific resistance of an electrophotographic magnetic carrier. As a result, counter charge after the development of a toner can be caused to escape to suppress a blank dot. The content of the conductive fine particles to be added to the coating resin is preferably 0.1 part by mass or more and 20 parts by mass or less with respect to 100 parts by mass of the coating resin. When the content is less than 0.1 part by mass, the effect of the addition of the conductive fine particles is hardly obtained, and when the content is more than 20 parts by mass, concern is raised about a reduction in tinge of the resin due to the separation of the conductive fine particles. Examples of the conductive fine particles include carbon black, titanium oxide, and silver.

In addition, fine particles may be incorporated into the coating resin for the purpose of, for example, improving the ability of the magnetic carrier to impart charge to a toner or improving the releasability thereof. Although the fine particles to be incorporated into the resin coating layer may be fine particles each formed of any one of an organic material and an inorganic material, crosslinked resin fine particles or inorganic fine particles each having such strength as to be capable of retaining its shape at the time of the coating of the magnetic core with the resin are preferred. Examples of a crosslinked resin for forming the crosslinked resin fine particles include a crosslinked polymethyl methacrylate resin, a crosslinked polystyrene resin, a melamine resin, a guanamine resin, a urea resin, a phenol resin, and a nylon resin. In addition, examples of the inorganic fine particles include silica, alumina, and titania. The content of the fine particles in the resin coating layer is preferably 0.1 part by mass or more and 20 parts by mass or less with respect to 100 parts by mass of the coating resin.

<Method of Producing Magnetic Core>

A known magnetic particle, such as a magnetite particle, a ferrite particle, or a magnetic material-dispersed resin particle, may be used as the magnetic core according to the present disclosure. Of those, a magnetic particle or magnetic material-dispersed resin particle obtained by filling the holes of a magnetic particle of a porous shape with a resin, that is, a magnetic particle containing a magnetic oxide and a resin composition is preferred from the viewpoint that the particle can reduce the specific gravity of the magnetic carrier, and hence can lengthen the lifetime thereof.

When the specific gravity of the magnetic carrier is reduced, a load on, for example, a toner in a developer state in a developing unit is alleviated, and hence the adhesion of a toner constituent component to the surface of the magnetic carrier can be prevented. A load between the particles of the magnetic carrier is also alleviated, thereby leading to further suppression of the wear and loss of the resin coating layer. In addition, the dot reproducibility of the toner can be improved, and hence a high-definition image can be obtained.

Although a copolymer resin to be used as the coating resin may be used as the resin to be incorporated into the holes of the magnetic particle of a porous shape, the resin is not limited thereto and a known resin may be used. The copolymer to be used as the coating resin is preferred as a thermoplastic resin to be incorporated into the holes, but in addition thereto, examples of the thermoplastic resin include polystyrene, polymethyl methacrylate, a styrene-acrylate copolymer, a styrene-methacrylate copolymer, a styrene-butadiene copolymer, an ethylene-vinyl acetate copolymer, polyvinyl chloride, polyvinyl acetate, a polyvinylidene fluoride resin, a fluorocarbon resin, a perfluorocarbon resin, a solvent-soluble perfluorocarbon resin, polyvinylpyrrolidone, a petroleum resin, a novolac resin, a saturated alkyl polyester resin, an aromatic polyester resin, such as polyethylene terephthalate, polybutylene terephthalate, or polyarylate, a polyamide resin, a polyacetal resin, a polycarbonate resin, a polyether sulfone resin, a polysulfone resin, a polyphenylene sulfide resin, and a polyether ketone resin.

As a thermosetting resin, there are given, for example, the following resins: a phenol resin, a modified phenol resin, a maleic resin, an alkyd resin, an epoxy resin, an acrylic resin, an unsaturated polyester obtained by the polycondensation of maleic anhydride, terephthalic acid, and a polyhydric alcohol, a urea resin, a melamine resin, a urea-melamine resin, a xylene resin, a toluene resin, a guanamine resin, a melamine-guanamine resin, an acetoguanamine resin, a glyptal resin, a furan resin, a silicone resin, polyimide, polyamide imide resin, a polyether imide resin, and a polyurethane resin.

An example of a method of filling the voids of a ferrite particle having a porous shape with a resin component is a method including diluting the resin component with a solvent and adding the porous magnetic core particle to the diluted liquid. The solvent to be used herein only needs to be capable of dissolving each resin component. In the case of an organic solvent-soluble resin, an organic solvent, such as toluene, xylene, cellosolve butyl acetate, methyl ethyl ketone, methyl isobutyl ketone, or methanol, only needs to be used. In addition, in the case of a water-soluble resin component or an emulsion-type resin component, water only needs to be used. An example of a method of adding the resin component diluted with the solvent to the inside of the porous magnetic core particle is a method including: impregnating the particle with the resin component by any one of application methods, such as a dipping method, a spray method, a brush coating method, a fluidized bed, and a kneading method; and then volatilizing the solvent. When a thermosetting resin is filled into the voids, the solvent is volatilized, and then the temperature of the resin to be used is increased to the temperature at which the resin to be used cures to perform a curing reaction.

Meanwhile, a specific method of producing a magnetic material-dispersed resin particle is, for example, the following method. The particle may be obtained by, for example, performing kneading so that a submicron magnetic material, such as iron powder, a magnetite particle, or a ferrite particle, may be dispersed in a thermoplastic resin, pulverizing the kneaded product to a desired magnetic carrier particle diameter, and subjecting the pulverized product to thermal or mechanical sphering treatment as required. In addition, the particle may be produced by dispersing the magnetic material in a monomer and polymerizing the monomer to form a resin.

Examples of the resin in this case include resins such as a vinyl resin, a polyester resin, an epoxy resin, a phenol resin, a urea resin, a polyurethane resin, a polyimide resin, a cellulose resin, a silicone resin, an acrylic resin, and a polyether resin. The resins may be used alone or as a mixed resin thereof. In particular, the phenol resin is preferred because the resin improves the strength of the magnetic core. The true density and specific resistance of the core may be adjusted by adjusting the amount of the magnetic material. Specifically, in the case of a magnetic material particle, the particle is preferably added at 70 mass % or more and 95 mass % or less with respect to the magnetic carrier.

The magnetic core preferably has a 50% particle diameter (D50) on a volume distribution basis of 20 μm or more and 80 μm or less because the core can be uniformly coated with the coating resin, and hence the density of a developer magnetic brush for preventing the adhesion of the magnetic carrier and obtaining a high-quality image becomes moderate.

With regard to the specific resistance of the magnetic core, the specific resistance value thereof in an electric field intensity of 1,000 (V/cm) is preferably $1.0 \times 10^5$ (Ω·cm) or more and $1.0 \times 10^{14}$ (Ω·cm) or less because satisfactory developability is obtained.

A method for the treatment of coating the surface of the magnetic core with the coating resin is not particularly limited, and the treatment may be performed by a known method. For example, a so-called dipping method including volatilizing the solvent of a coating resin solution, while stirring the magnetic core and the coating resin solution, to coat the surface of the magnetic core with the coating resin is available. Specific examples of an apparatus to be used in the method include a universal mixing and stirring machine (manufactured by Fuji Paudal Co., Ltd.) and a Nauta mixer (manufactured by Hosokawa Micron Corporation). In addition, a method including spraying the coating resin solution from a spray nozzle, while forming a fluidized bed, to coat the surface of the magnetic core with the coating resin is available. Specific examples of an apparatus to be used in the method include SPIRA COTA (manufactured by Okada Seiko Co., Ltd.) and SPIR-A-FLOW (manufactured by Freund Corporation). In addition, a method including coating the magnetic core with the coating resin in a particle state in a dry manner is available. A specific example of the method may be a treatment method including using an apparatus such as HYBRIDIZER (manufactured by Nara Machinery Co., Ltd.), MECHANOFUSION (manufactured by Hosokawa Micron Corporation), HIGH FLEX GRAL (manufactured by Fukae Powtec K.K.), or THETA COMPOSER (manufactured by Tokuju Corporation).

Next, the magnetic carrier is described.
<Magnetic Carrier>

The magnetization of the magnetic carrier under a magnetic field of 5,000/4π (kA/m) is preferably 40 ($Am^2/kg$) or more and 80 ($Am^2/kg$) or less. When the magnetization of the magnetic carrier falls within the range, a magnetic binding force on a developing sleeve is moderate, and hence the occurrence of the adhesion of the magnetic carrier can be more satisfactorily suppressed. In addition, a stress to be applied to a toner in a magnetic brush can be reduced, and hence the deterioration of the toner and the adhesion thereof to any other member can be satisfactorily suppressed.

In addition, the magnetization of the magnetic carrier may be appropriately adjusted by the amount of a resin to be incorporated thereinto. The residual magnetization of the magnetic carrier is preferably 20.0 ($Am^2/kg$) or less, more preferably 10.0 ($Am^2/kg$) or less. When the residual magnetization of the magnetic carrier falls within the ranges, particularly satisfactory flowability as a developer is obtained, and hence satisfactory dot reproducibility is obtained.

The true density of the magnetic carrier is preferably 2.5 ($g/cm^3$) or more and 5.5 ($g/cm^3$) or less, more preferably 3.0 ($g/cm^3$) or more and 5.0 ($g/cm^3$) or less. A two-component developer including the magnetic carrier having a true density in the ranges applies a small load to its toner, and hence suppresses the adhesion of a toner constituent component to the magnetic carrier. In addition, to achieve both of satisfactory developability and the prevention of the adhesion of the magnetic carrier in a low electric field intensity, a true density in the ranges is preferred for the magnetic carrier.

The magnetic carrier preferably has a 50% particle diameter (D50) on a volume distribution basis of 21 μm or more and 81 μm or less because each of the ability of the carrier to impart charge to a toner, the suppression of the adhesion of the magnetic carrier to an image region, and an improvement in image quality is excellent. The particle diameter is more preferably 25 μm or more and 60 μm or less.

Next, the configuration of a toner preferred for achieving aspects of the present disclosure is described in detail below.
<Binder Resin>

In the toner particle of the present disclosure, for example, the following polymers may each be used as a binder resin: homopolymers of styrene and a substitution product thereof, such as polystyrene, poly-p-chlorostyrene, and polyvinyltoluene; styrene-based copolymers, such as a styrene-p-chlorostyrene copolymer, a styrene-vinyltoluene copolymer, a styrene-vinylnaphthalene copolymer, a styrene-acrylate copolymer, and a styrene-methacrylate copolymer; hybrid resins each obtained by the mixing of a styrene-based copolymer resin, a polyester resin, or a polyester resin, and a vinyl-based resin, or the reaction of part of both the resins; and polyvinyl chloride, a phenol resin, a natural modified phenol resin, a natural resin-modified maleic acid resin, an acrylic resin, a methacrylic resin, polyvinyl acetate, a silicone resin, a polyester resin, polyurethane, a polyamide resin, a furan resin, an epoxy resin, a xylene resin, a polyethylene resin, and a polypropylene resin. Of those, a polyester resin is preferably used as a main component because excellent low-temperature fixability is obtained.

A polyhydric alcohol (alcohol that is dihydric or trihydric or more) and a polyvalent carboxylic acid (carboxylic acid that is divalent or trivalent or more), or an acid anhydride or lower alkyl ester thereof are used as monomers to be used in the polyester unit of the polyester resin. Herein, to produce a branched polymer for expressing "strain curability," partial crosslinking in a molecule of an amorphous resin is effective. To perform the partial crosslinking, a polyfunctional compound that is trivalent or more is preferably used. Accordingly, the resin preferably contains, as a raw material monomer for its polyester unit, a carboxylic acid that is trivalent or more, or an acid anhydride or lower alkyl ester thereof, and/or an alcohol that is trihydric or more.

The following polyhydric alcohol monomers may each be used as a polyhydric alcohol monomer to be used in the polyester unit of the polyester resin.

Examples of the dihydric alcohol component include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and a bisphenol represented by the formula (A) and derivatives thereof; and a diol represented by the formula (B):

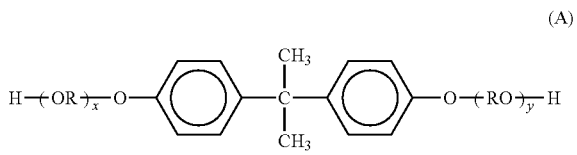
(A)

where R represents an ethylene or propylene group, "x" and "y" each represent an integer of 0 or more, and the average of x+y is 0 or more and 10 or less;

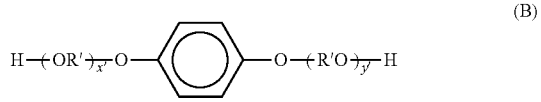
(B)

where R' represents

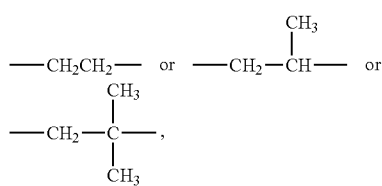

and x' and y' each represent an integer of 0 or more, and the average of x'+y' is from 0 to 10.

Examples of the alcohol component that is trihydric or more include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Of those, glycerol, trimethylolpropane, and pentaerythritol are preferably used. Those dihydric alcohols and alcohols that are trihydric or more may be used alone or in combination thereof.

The following polyvalent carboxylic acid monomers may each be used as a polyvalent carboxylic acid monomer to be used in the polyester unit of the polyester resin.

Examples of the divalent carboxylic acid component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, acid anhydrides thereof, and lower alkyl esters thereof. Of those, maleic acid, fumaric acid, terephthalic acid, and n-dodecenylsuccinic acid are preferably used.

Examples of the carboxylic acid that is trivalent or more, the acid anhydride thereof, or the lower alkyl ester thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, Empol trimer acid, acid anhydrides thereof, and lower alkyl esters thereof. Of those, in particular, 1,2,4-benzenetricarboxylic acid, that is, trimellitic acid or a derivative thereof is preferably used because the acid or the derivative thereof is inexpensive, and its reaction is easy to control. The divalent carboxylic acids and the like, and the carboxylic acids that are trivalent or more described above may be used alone or in combination thereof.

A method of producing the polyester unit of the present disclosure is not particularly limited, and a known method may be used. For example, the alcohol monomer and the carboxylic acid monomer described above are simultaneously loaded into a reaction vessel, and are polymerized through an esterification reaction or a transesterification reaction, and a condensation reaction to produce the polyester resin. In addition, a polymerization temperature, which is not particularly limited, preferably falls within the range of from 180° C. or more to 290° C. or less. At the time of the polymerization of the polyester unit, a polymerization catalyst, such as a titanium-based catalyst, a tin-based catalyst, zinc acetate, antimony trioxide, or germanium dioxide, may be used. In particular, the binder resin of the present disclosure is more preferably a polyester unit polymerized by using a tin-based catalyst.

In addition, it is preferred that the acid value of the polyester resin be 5 mgKOH/g or more and 20 mgKOH/g or less, and the hydroxyl value thereof be 20 mgKOH/g or more and 70 mgKOH/g or less. This is because of the following reason. The moisture adsorption amount of the resin under a high-temperature and high-humidity environment is suppressed, and hence the non-electrostatic adhesive force thereof can be suppressed to a low level. Accordingly, excellent fogging resistance is obtained.

In addition, a mixture of a low-molecular weight resin and a high-molecular weight resin may be used as the binder resin. A content ratio between the high-molecular weight resin and the low-molecular weight resin is preferably 40/60 or more and 85/15 or less on a mass basis because excellent low-temperature fixability and hot offset resistance are obtained.

<Release Agent>

Examples of the wax to be used in the toner of the present disclosure include: a hydrocarbon-based wax, such as low-molecular-weight polyethylene, low-molecular-weight polypropylene, an alkylene copolymer, a microcrystalline wax, a paraffin wax, or a Fischer-Tropsch wax; an oxide of a hydrocarbon-based wax, such as an oxidized polyethylene wax or a block copolymerization product thereof; a wax containing a fatty acid ester as a main component, such as a carnauba wax; and a wax obtained by subjecting part or all of a fatty acid ester to deacidification, such as a deacidified carnauba wax. Further examples thereof include: a saturated straight-chain fatty acid, such as palmitic acid, stearic acid, or montanic acid; an unsaturated fatty acid, such as brassidic acid, eleostearic acid, or parinaric acid; a saturated alcohol, such as stearyl alcohol, aralkyl alcohol, behenyl alcohol, camaubyl alcohol, ceryl alcohol, or melissyl alcohol; a polyhydric alcohol, such as sorbitol; an ester formed of a fatty acid, such as palmitic acid, stearic acid, behenic acid, or montanic acid, and an alcohol, such as stearyl alcohol, aralkyl alcohol, behenyl alcohol, camaubyl alcohol, ceryl alcohol, or melissyl alcohol; a fatty acid amide, such as linoleamide, oleamide, or lauramide; a saturated fatty acid bisamide, such as methylenebisstearamide, ethylenebiscapramide, ethylenebislauramide, or hexamethylenebisstearamide; an unsaturated fatty acid amide, such as ethylenebisoleamide, hexamethylenebisoleamide, N,N'-dioleyladipamide, or N,N'-dioleylsebacamide; an aromatic bisamide, such as m-xylenebisstearamide or N,N'-distearylisophthalamide; an aliphatic metal salt, such as calcium stearate, calcium laurate, zinc stearate, or magnesium stearate (generally referred to as metal soap); a wax obtained by grafting an aliphatic hydrocarbon-based wax with a vinyl-based monomer, such as styrene or acrylic acid; a partially esterified product formed of a fatty acid and a polyhydric alcohol, such as behenic acid monoglyceride; and a methyl ester compound having a hydroxyl group obtained by subjecting a vegetable oil and fat to hydrogenation.

Of those waxes, a hydrocarbon-based wax, such as a paraffin wax or a Fischer-Tropsch wax, or a fatty acid ester-based wax, such as a carnauba wax, is preferred from the viewpoint of improving the low-temperature fixability and fixation separability of the toner. In the present disclosure, a hydrocarbon-based wax is more preferred because the hot offset resistance of the toner is further improved.

In the present disclosure, the wax is preferably used in an amount of 3 parts by mass or more and 8 parts by mass or less per 100 parts by mass of the binder resin.

In addition, the peak temperature of the highest endothermic peak of the wax in an endothermic curve at the time of temperature increase measured with a differential scanning calorimeter (DSC) is preferably 45° C. or more and 140° C. or less. The peak temperature of the highest endothermic peak of the wax preferably falls within the range because the toner can achieve both of excellent storage stability and excellent hot offset resistance.

<Colorant>

The toner particle in the present disclosure may contain a colorant. Examples of the colorant include the following colorants.

A black colorant is, for example, carbon black or a colorant toned to a black color with a yellow colorant, a magenta colorant, and a cyan colorant. A pigment may be used alone as the coloring agent, but it is more preferred to use a dye and a pigment in combination to improve the color definition from the viewpoint of the image quality of a full-color image.

As a pigment for magenta toner, there are given, for example: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, or 282; C.I. Pigment Violet 19; and C.I. Vat Red 1, 2, 10, 13, 15, 23, 29, or 35.

As a dye for magenta toner, there are given, for example: oil-soluble dyes, such as: C.I. Solvent Red 1, 3, 8, 23, 24, 25, 27, 30, 49, 81, 82, 83, 84, 100, 109, or 121; C.I. Disperse Red 9; C.I. Solvent Violet 8, 13, 14, 21, or 27; and C.I. Disperse Violet 1; and basic dyes, such as: C.I. Basic Red 1, 2, 9, 12, 13, 14, 15, 17, 18, 22, 23, 24, 27, 29, 32, 34, 35, 36, 37, 38, 39, or 40; and C.I. Basic Violet 1, 3, 7, 10, 14, 15, 21, 25, 26, 27, or 28.

As a pigment for cyan toner, there are given, for example: C.I. Pigment Blue 2, 3, 15:2, 15:3, 15:4, 16, or 17; C.I. Vat Blue 6; C.I. Acid Blue 45; and a copper phthalocyanine pigment in which a phthalocyanine skeleton is substituted with 1 to 5 phthalimidomethyl groups.

A dye for cyan toner is, for example, C.I. Solvent Blue 70.

As a pigment for yellow toner, there are given, for example: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, or 185; and C.I. Vat Yellow 1, 3, or 20.

A dye for yellow toner is, for example, C.I. Solvent Yellow 162.

Those colorants may be used alone or as a mixture thereof, and may each be used under the state of a solid solution. The colorant is selected in terms of a hue angle, chroma, lightness, light resistance, OHP transparency, and dispersibility in the toner.

The content of the colorant is preferably 0.1 part by mass or more and 30.0 parts by mass or less with respect to the total amount of the resin component.

<Inorganic Fine Particles>

The toner preferably contains inorganic fine particles for the main purpose of improving its flowability and chargeability, and a mode in which the fine particles adhere to the surface of the toner is preferred.

Silica particles having a highest peak particle diameter on a number distribution basis of 80 nm or more and 200 nm or less are preferred as the inorganic fine particles serving as spacer particles for improving releasability between the toner and the magnetic carrier. The particle diameter is more preferably 100 nm or more and 150 nm or less in order that the inorganic fine particles may be more satisfactorily suppressed from separating from the toner while being caused to function as spacer particles.

In addition, to improve the flowability of the toner, inorganic fine particles having a highest peak particle diameter on a number distribution basis of 20 nm or more and 50 nm or less are preferably incorporated, and a mode in which the fine particles are used in combination with the silica particles is also preferred.

Further, any other external additive may be added to the toner particle with a view to improving the flowability and transferability of the toner. The external additive to be externally added to the surface of the toner particle preferably contains inorganic fine particles each formed of, for example, titanium oxide, alumina oxide, or silica, and a plurality of kinds of external additives may be used in combination.

The total content of the external additives is preferably 0.3 part by mass or more and 5.0 parts by mass or less, more preferably 0.8 part by mass or more and 4.0 parts by mass or less with respect to 100 parts by mass of the toner particle. The content of the silica particles having a highest peak particle diameter on a number distribution basis of 80 nm or more and 200 nm or less out of the external additives is preferably 0.1 part by mass or more and 2.5 parts by mass or less, more preferably 0.5 part by mass or more and 2.0 parts by mass or less. When the content falls within the ranges, the effect of the particles serving as spacer particles becomes more significant.

In addition, the surfaces of the silica particles or the inorganic fine particles to be used as an external additive are preferably subjected to hydrophobic treatment. The hydrophobic treatment is preferably performed with: coupling agents, such as various titanium coupling agents and silane coupling agents; fatty acids and metal salts thereof; silicone oils; or combinations thereof.

Examples of the titanium coupling agent include tetrabutyl titanate, tetraoctyl titanate, isopropyltriisostearoyl titanate, isopropyltridecylbenzenesulfonyl titanate, and bis(dioctylpyrophosphate)oxyacetate titanate.

In addition, examples of the silane coupling agent include γ-(2-aminoethyl)aminopropyltrimethoxysilane, γ-(2-aminoethyl)aminopropylmethyldimethoxysilane, γ-methacryloxypropyltrimethoxysilane, N-β-(N-vinylbenzylaminoethyl)-γ-aminopropyltrimethoxysilane hydrochloride, hexamethyldisilazane, methyltrimethoxysilane, butyltrimethoxysilane, isobutyltrimethoxysilane, hexyltrimethoxysilane, octyltrimethoxysilane, decyltrimethoxysilane, dodecyltrimethoxysilane, phenyltrimethoxysilane, o-methylphenyltrimethoxysilane, and p-methylphenyltrimethoxysilane.

Examples of the fatty acid include long-chain fatty acids, such as undecylic acid, lauric acid, tridecylic acid, dodecylic acid, myristic acid, palmitic acid, pentadecylic acid, stearic acid, heptadecylic acid, arachic acid, montanoic acid, oleic acid, linoleic acid, and arachidonic acid. As a metal of a metal salt of such fatty acid, there are given, for example, zinc, iron, magnesium, aluminum, calcium, sodium, and lithium.

Examples of the silicone oil include a dimethylsilicone oil, a methylphenylsilicone oil, and an amino-modified silicone oil.

The hydrophobic treatment is preferably performed by adding a hydrophobic treatment agent to particles to be treated at 1 mass % or more and 30 mass % or less (more preferably 3 mass % or more and 7 mass % or less) with respect to the particles to be treated to coat the particles to be treated.

Although the degree of hydrophobicity of the hydrophobic-treated external additive is not particularly limited, the degree of hydrophobicity after the treatment is preferably, for example, 40 or more and 98 or less. The degree of hydrophobicity represents the wettability of the sample to methanol, and is an indicator of the hydrophobicity thereof.

When the toner of the present disclosure is mixed with the magnetic carrier to be used as a two-component developer, the mixing ratio of the magnetic carrier at the time is set to 2 mass % or more and 15 mass % or less, preferably 4 mass % or more and 13 mass % or less in terms of the concentration of the toner in the developer because satisfactory results are typically obtained. When the toner concentration is less than 2 mass %, an image density is liable to reduce, and when the toner concentration is more than 15 mass %, fogging or the scattering of the toner in an image-forming apparatus is liable to occur.

In addition, in a developer for replenishment to be replenished into a developing unit in accordance with a reduction in toner concentration of a two-component developer in the developing unit, the amount of its toner is 2 parts by mass or more and 50 parts by mass or less with respect to 1 part by mass of its magnetic carrier for replenishment.

Next, an image-forming apparatus including a developing device using the magnetic carrier, two-component developer, and developer for replenishment of the present disclosure is described by taking an example. However, the developing device to be used in a developing method of the present disclosure is not limited thereto.

<Image-Forming Method>

Figure 2:
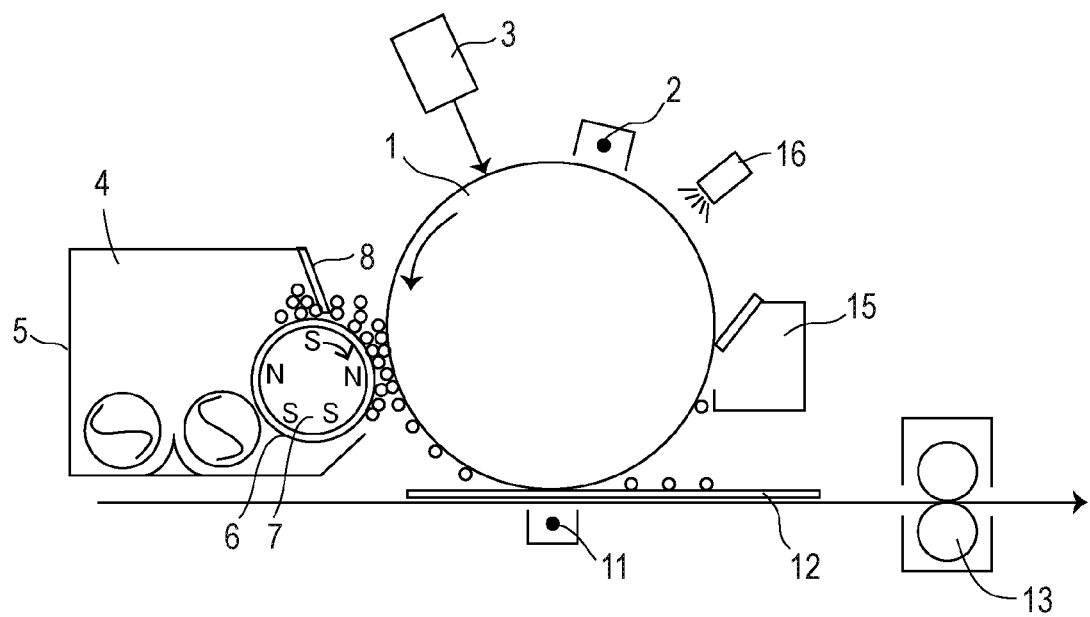
FIG. 2 is a schematic view of an image-forming apparatus used in the present disclosure.

In FIG. 2, an electrostatic latent image-bearing member 1 rotates in a direction indicated by an arrow in the figure (counterclockwise direction). The electrostatic latent image-bearing member 1 is charged by a charger 2 that is a charging unit (charging step), and an electrostatic latent image is formed on the surface of the charged electrostatic latent image-bearing member 1 by exposure to light from an exposing unit 3 that is an electrostatic latent image-forming unit (electrostatic latent image-forming step).

A developing unit 4 has a developer container 5 for storing a two-component developer, and a developer-carrying member 6 is arranged therein under a rotatable state. In addition, the developer-carrying member 6 has included therein magnets 7 serving as magnetic field-generating units. At least one of the magnets 7 is arranged at such a position as to face the latent image-bearing member. The two-component developer is held on the developer-carrying member 6 by the magnetic field of the magnets 7, and the amount of the two-component developer is regulated by a regulating member 8, followed by the conveyance thereof to a developing portion facing the electrostatic latent image-bearing member 1. In the developing portion, a magnetic brush is formed by the magnetic field generated by the magnets 7. After that, a developing bias obtained by superimposing an AC electric field on a DC electric field is applied to visualize the electrostatic latent image as a toner image (developing step).

The toner image formed on the electrostatic latent image-bearing member 1 is electrostatically transferred onto a recording medium (transfer material) 12 by a transfer charger 11 (transferring step).

Figure 3:
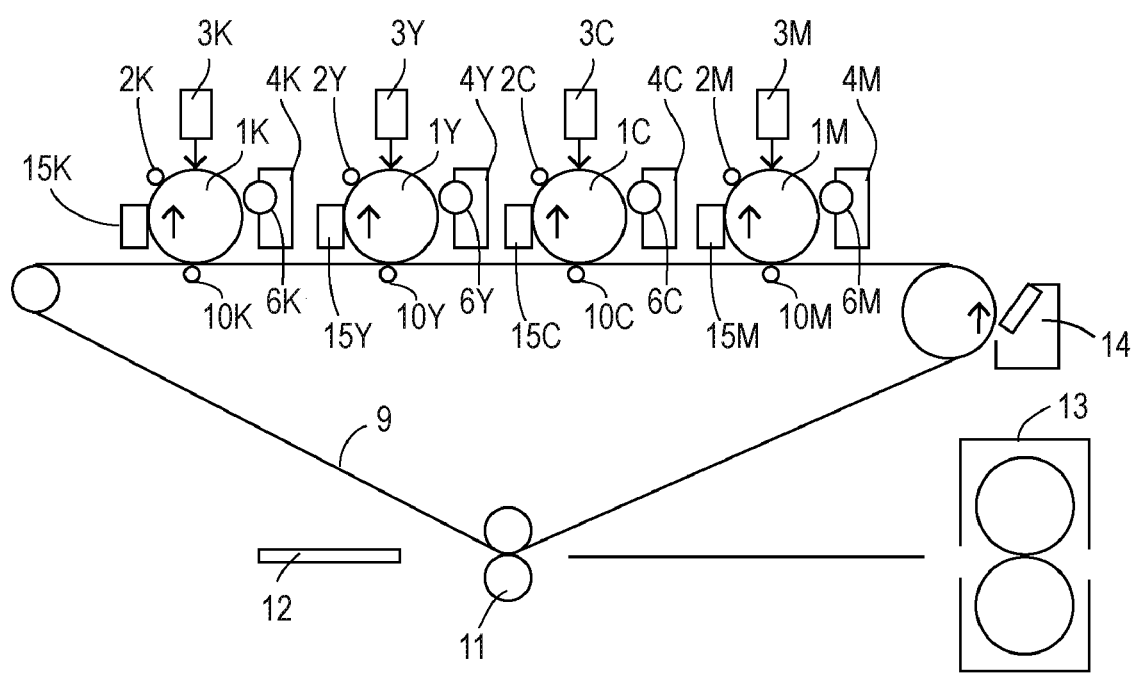
FIG. 3 is a schematic view of a full-color image-forming apparatus used in the present disclosure.

Herein, the following step may be performed (transferring step): as illustrated in FIG. 3, the toner image is transferred from the electrostatic latent image-bearing member 1 onto an intermediate transfer body 9 once, and is then electrostatically transferred onto the recording medium 12 serving as a transfer material.

After that, the recording medium 12 is conveyed to a fixing unit 13 where the medium is heated and pressurized. Thus, the toner of the developer is fixed onto the recording medium 12 (fixing step).

After that, the recording medium 12 is discharged as an output image to the outside of the apparatus. After the transferring step, the toner remaining on the electrostatic latent image-bearing member 1 is removed by a cleaner 15. After that, the electrostatic latent image-bearing member 1 cleaned by the cleaner 15 is electrically initialized by the application of light from a pre-exposing unit 16, and the above-mentioned image-forming operation is repeated.

FIG. 3 is an illustration of an example of a schematic view of a case in which the image-forming method of the present disclosure is applied to a full-color image-forming apparatus.

The arrangement of image-forming units represented by, for example, K, Y, C, and M, and arrows indicating their rotation directions in the figure are by no means limited thereto. Incidentally, K, Y, C, and M mean black, yellow, cyan, and magenta, respectively.

In FIG. 3, electrostatic latent image-bearing members 1K, 1Y, 1C, and 1M each rotate in the direction indicated by the arrow in the figure (clockwise direction). The respective electrostatic latent image-bearing members are charged by chargers 2K, 2Y, 2C, and 2M that are charging units (charging step). Electrostatic latent images are formed on the surfaces of the respective charged electrostatic latent image-bearing members by exposure to light from exposing units 3K, 3Y, 3C, and 3M that are electrostatic latent image-forming units (electrostatic latent image-forming step). After that, the electrostatic latent images are visualized as toner images by two-component developers carried on developer-carrying members 6K, 6Y, 6C, and 6M included in developing units 4K, 4Y, 4C, and 4M that are developing units (developing step). The toners of the developers remaining on the respective electrostatic latent image-bearing members are removed by cleaners 15K, 15Y, 15C, and 15M, respectively. Further, the toner images are transferred onto the intermediate transfer body 9 by intermediate transfer chargers 10K, 10Y, 10C, and 10M that are transferring units. Further, the toner images are transferred onto the recording medium 12 by the transfer charger 11 that is a transferring unit (transferring step). The toner images on the recording medium 12 are fixed under heat and pressure by the fixing unit 13 that is a fixing unit (fixing step), and the medium is output as an image.

Then, an intermediate transfer member cleaner 14 that is a cleaning member for the intermediate transfer member 9 recovers transfer residual toners and the like. In the developing method of the present disclosure, specifically, the development is preferably performed under a state in which while an AC voltage is applied to each of the developer-carrying members to form an AC electric field in a developing region, a magnetic brush is brought into contact with a photosensitive member. A distance (S-D distance) between the developer-carrying member (developing sleeve) 6 and a photosensitive drum is preferably 100 μm or more and 1,000 μm or less in terms of the suppression of the adhesion of the magnetic carrier and an improvement in dot reproducibility. When the distance is less than 100 μm, the supply of the developer is liable to be insufficient, and hence an image density reduces. When the distance is more than 1,000 μm, lines of magnetic force from a magnetic pole Si spread to reduce the density of the magnetic brush, thereby causing an event, such as a reduction in dot reproducibility or the flying of the magnetic carrier toward the photosensitive member due to the weakening of a binding force on the magnetic carrier. The occurrence of the event is responsible for a reduction in image quality and the shortening of the lifetime of a part of the image-forming apparatus.

The peak-to-peak voltage (Vpp) of the AC electric field is 300 V or more and 3,000 V or less, preferably 500 V or more and 1,800 V or less. In addition, the frequency of the electric field is 500 Hz or more and 10,000 Hz or less, preferably 1,000 Hz or more and 7,000 Hz or less, and an electric field having such peak-to-peak voltage and frequency may be appropriately selected and used in accordance with a process. In this case, the waveform of an AC bias for forming the AC electric field is, for example, a triangular wave, a rectangular wave, a sinusoidal wave, or a waveform whose duty ratio has been changed. To adapt to a change in speed at which the toner image is formed, the development is sometimes preferably performed by applying, to each of the developer-carrying members, a developing bias voltage having a discontinuous AC bias voltage (intermittent AC superimposed voltage). When the applied voltage is less than 300 V, a sufficient image density is hardly obtained, and the fogging toner of a non-image portion cannot be satisfactorily recovered in some cases. In addition, when the applied voltage is more than 3,000 V, the latent image may be disturbed through the magnetic brush to cause a reduction in image quality.

When a two-component developer including a satisfactorily charged toner is used, a fog-removing voltage (Vback) can be reduced, and hence the primary charging of a photosensitive member can be reduced. Thus, the lifetime of the photosensitive member can be lengthened. The Vback is preferably 200 V or less, more preferably 150 V or less, though the preferred value varies depending on a developing system. A contrast potential of 100 V or more and 400 V or less is preferably used so that a sufficient image density may be obtained.

In addition, the configuration of each of the electrostatic latent image-bearing members may be the same as that of a photosensitive member typically used in an image-forming apparatus, though its process speed is affected when the frequency is lower than 500 Hz. For example, there is given a photosensitive member having a configuration in which a conductive layer, an undercoat layer, a charge-generating layer, and a charge-transporting layer, and as required, a charge-injecting layer are sequentially arranged on a conductive substrate made of, for example, aluminum or SUS.

The conductive layer, the undercoat layer, the charge-generating layer, and the charge-transporting layer may be those typically used in a photosensitive member. For example, the charge-injecting layer or a protective layer may be used as the outermost surface layer of the photosensitive member.

<Method of Measuring Si Atom Concentration by XPS>

The magnetic carrier is bonded onto indium foil. At that time, the particles of the carrier are uniformly bonded thereonto so that the indium foil portion may not be exposed.

Measurement conditions are as described below.

Apparatus: PHI 5000 VERSAPROBE II (ULVAC-PHI, Inc.)
Applied ray: AlKα ray
Output: 25 W, 15 kV
Photoelectron-capturing angle: 45°
Pass Energy: 58.7 eV
Stepsize: 0.125 eV
XPS peak: C1s, O1s, Si2p, Ti2p, Sr3d
GUN type: GCIB
Time: 75 min
Interval: 1.5 min
Sputter Setting: 5 kV When the interval is set to 1.5 min as described in the conditions, elemental analysis can be performed at a position distant from the surface of the magnetic carrier by about 1.0 nm in its depth direction. Accordingly, the analysis can be performed every 1.0 nm to a depth of 20 nm.

<Method of Measuring 50% Particle Diameter (D50) on Volume Distribution Basis of Each of Magnetic Carrier and Porous Magnetic Core>

Particle size distribution measurement was performed with a particle size distribution-measuring apparatus "Microtrac MT3300EX" (manufactured by Nikkiso Co., Ltd.) of a laser diffraction/scattering system.

At the time of the measurement of the 50% particle diameter (D50) on a volume distribution basis of each of the magnetic carrier and the porous magnetic core, the apparatus was mounted with a sample-supplying machine "one-shot dry type sample conditioner Turbotrac" (manufactured by Nikkiso Co., Ltd.) for dry measurement. Conditions under which the Turbotrac supplies a sample are as described below. A dust collector was used as a reduced-pressure source, and its airflow rate and pressure were set to about 33 L/sec and about 17 kPa, respectively. The control of the machine is automatically performed on software. A 50% particle diameter (D50) that is a 50% accumulated value in a volume distribution is determined as a particle diameter. The control and the analysis are performed with the software included with the machine (version 10.3.3-202D). Conditions for the measurement are as described below.

Set Zero time: 10 seconds
Measurement time: 10 seconds
Measurement frequency: 1
Particle refractive index: 1.81%
Particle shape: nonspherical
Measurement upper limit: 1,408 μm Measurement lower limit: 0.243 μm
Measurement environment: temperature of 23° C. and relative humidity of 50%

<Measurement of Pore Diameter and Pore Volume of Porous Magnetic Core>

The pore diameter distribution of the porous magnetic core is measured by a mercury penetration method.

A measurement principle is as described below.

In the measurement, a pressure to be applied to mercury is changed and the amount of mercury that penetrates a pore at the pressure is measured. The condition under which mercury can penetrate the pore may be represented by the following equation in consideration of the equilibrium of forces: $PD=-4\sigma \cos\theta$ where P represents a pressure, D represents the diameter of the pore, and $\theta$ and $\sigma$ represent the contact angle and surface tension of mercury, respectively. When the contact angle and the surface tension are constants, the pressure P and the diameter D of the pore which mercury can penetrate at the pressure are inversely proportional to each other. In view of the foregoing, a pore diameter distribution was determined by automatically replacing the axis of abscissa P of a P-V curve, which was obtained by measuring the amount V of the liquid to penetrate at the pressure P while changing the pressure, with the pore diameter based on the equation.

The measurement may be performed with a measuring apparatus, such as a fully automatic multifunctional mercury porosimeter PoreMaster series/PoreMaster-GT series manufactured by Yuasa Ionics or an automatic porosimeter Autopore IV9500 series manufactured by Shimadzu Corporation.

Specifically, the measurement was performed with Autopore IV9520 manufactured by Shimadzu Corporation under the following conditions by the following procedure.

Measurement conditions
Measurement environment: 20° C.
Measurement cell
  Sample volume: 5 cm$^3$
  Penetration volume: 1.1 cm$^3$
  Application: for powder
Measuring range: 2.0 psia (13.8 kPa) or more and 59,989.6 psia (413.6 MPa) or less
Measuring step: 80 steps (steps are provided so as to be arranged at an equal interval when the pore diameter is represented on a logarithmic scale)
Penetration parameter
  Exhaust pressure: 50 μmHg
  Exhaust time: 5.0 min
  Mercury injection pressure: 2.0 psia (13.8 kPa)
  Equilibrium time: 5 secs
High-pressure parameter
  Equilibrium time: 5 secs
Mercury parameter
  Advancing contact angle: 130.0 degrees
  Receding contact angle: 130.0 degrees
  Surface tension: 485.0 mN/m (485.0 dynes/cm)
  Mercury density: 13.5335 g/mL Measurement Procedure
(1) About 1.0 g of the porous magnetic core is weighed and loaded into a sample cell. The weighed value is input.
(2) A mercury injection amount in the range of from 2.0 psia (13.8 kPa) or more to 45.8 psia (315.6 kPa) or less is measured in a low-pressure portion.
(3) A mercury injection amount in the range of from 45.9 psia (316.3 kPa) or more to 59,989.6 psia (413.6 MPa) or less is measured in a high-pressure portion.
(4) The pore diameter distribution is calculated from the mercury injection pressure and the mercury injection amount.

The steps (2), (3), and (4) were automatically performed with the software included with the apparatus.

The pore diameter at which a differential pore volume in the pore diameter range of from 0.1 μm or more to 3.0 μm or less becomes maximum is read from the pore diameter distribution measured as described above, and the read pore diameter is adopted as the pore diameter at which the differential pore volume becomes a local maximum.

In addition, the pore volume was calculated by integrating the differential pore volume in the pore diameter range of from 0.1 μm or more to 3.0 μm or less with the software included with the apparatus.

<Methods of Measuring Weight-Average Particle Diameter (D4) and Number-Average Particle Diameter (D1)>

The weight-average particle diameter (D4) and number-average particle diameter (D1) of the toner were measured with CDA-1000X (manufactured by Sysmex Corporation).

<Powder X-Ray Diffraction Analysis>

The XRD pattern of the toner was measured with an X-ray diffractometer (X'pertPRO-MPD: manufactured by PANalytical).

An X-ray was generated at an acceleration voltage of 45 kV and a current of 40 mA.

Measurement conditions for the powder X-ray diffraction analysis were set as described below.

Divergence slit: ¼ rad (fixed)
Scattering prevention slit: ½ rad
Solar slit: 0.04 rad
Mask: 15 mm
Anti-scatter slit: 7.5 mm
Spinner: Present
Measurement method: Continuous method
Scan axis: 2θ/θ
Measurement range: $5.0°\leq 2\theta \leq 80°$
Step interval: 0.026 deg/s
Scan rate: 0.525 deg/s <Method of Measuring Magnetization of Magnetic Core>

The magnetization of the magnetic core may be determined with an oscillating field-type magnetic characteristic-measuring apparatus (vibrating sample magnetometer) and a DC magnetization characteristic-recording apparatus (B-H tracer). In Examples to be described later, the magnetization is measured with an oscillating field-type magnetic characteristic-measuring apparatus BHV-30 (manufactured by Riken Denshi Co., Ltd.) by the following procedure.

The magnetic core is filled into a cylindrical plastic container in a sufficiently dense manner to provide a sample. The actual mass of the sample filled into the container is measured. After that, the sample in the plastic container is bonded to the container with an instant adhesive so that the sample may not move.

An external magnetic field axis and a magnetization moment axis in 5,000/4π (kA/m) are calibrated with a standard sample.

The magnetization of the sample was measured from the loop of the magnetization moment thereof obtained by setting a sweep rate to 5 (min/loop) and applying an external magnetic field of 5,000/4π (kA/m) to the sample. The magnetization (Am$^2$/kg) of the magnetic core is determined by dividing the measured value by the weight of the sample.

<Measurement of Average Layer Thickness of Resin Coating Layer>

With regard to the average layer thickness of the resin coating layer, a section of the magnetic carrier was observed with a transmission electron microscope (TEM) (at a magnification of 50,000 in each observation), and the thickness of the resin coating layer was measured.

Specifically, the magnetic carrier was subjected to ion milling with an argon ion milling apparatus (manufactured by Hitachi High-Technologies Corporation, product name: E-3500), and the thickness of the resin coating layer in the section of the magnetic carrier was measured at 5 arbitrary sites for each particle with the transmission electron microscope (TEM) (at a magnification of 50,000 in each measurement).

The same measurement as that described above was performed for 10 particles of the magnetic carrier, and the average of the 50 measured values of the thicknesses of the resin coating layers thus obtained was adopted as the average layer thickness. Measurement conditions for the ion milling are as described below.

Beam diameter: 400 μm (half-width)
Ion gun acceleration voltage: 5 kV
Ion gun discharge voltage: 4 kV
Ion gun discharge current: 463 μA
Ion gun irradiation current amount: 90 μA/cm$^3$/1 min <Method of Producing Toner>

Although a method of producing the toner particle is not particularly limited, a pulverization method is preferred because a release agent and a polymer obtained by the graft polymerization of a styrene acrylic polymer to a polyolefin are easily dispersed. This is because of the following reason. When the toner particle is produced in an aqueous medium, the release agent having high hydrophobicity and the polymer obtained by the graft polymerization of the styrene acrylic polymer to the polyolefin tend to localize in the toner particle. Accordingly, a core-shell structure is hardly formed by the above-mentioned heat treatment apparatus.

Now, a production process for the toner based on the pulverization method is described.

In a raw material-mixing step, predetermined amounts of materials for forming the toner particles, for example, the binder resin, the release agent, the colorant, the crystalline polyester, and as required, other components, such as the charge control agent, are weighed, and the materials are blended and mixed. As a mixing apparatus, there are given, for example, a double cone mixer, a V-type mixer, a drum type mixer, a super mixer, a Henschel mixer, a Nauta mixer, and MECHANO HYBRID (manufactured by Nippon Coke & Engineering Co., Ltd.).

Next, the mixed materials are melted and kneaded so that the wax and the like may be dispersed in the binder resin. In the melting and kneading step, a batch type kneading machine, such as a pressure kneader or a Banbury mixer, or a continuous kneading machine may be used, and a single or twin screw extruder is mainly used because of having an advantage in that continuous production can be performed. Examples thereof include a KTK type twin screw extruder (manufactured by Kobe Steel, Ltd.), a TEM type twin screw extruder (manufactured by Toshiba Machine Co., Ltd.), a PCM kneader (manufactured by Ikegai Corp.), a twin screw extruder (manufactured by KCK), a co-kneader (manufactured by BUSS), and Kneadex (manufactured by Nippon Coke & Engineering Co., Ltd.). Further, a resin composition to be obtained by the melting and kneading is rolled with a two-roll mill or the like, and may be cooled with water or the like in a cooling step.

Next, the cooled product of the resin composition is pulverized to a desired particle diameter in a pulverizing step. In the pulverizing step, the cooled product is coarsely pulverized with, for example, a pulverizer, and is then finely pulverized with, for example, a fine pulverizer.

Examples of the pulverizer include a crusher, a hammer mill, and a feather mill. The fine pulverizer is, for example, Kryptron System (manufactured by Kawasaki Heavy Industries, Ltd.), Super Rotor (manufactured by Nisshin Engineering Inc.), Turbo Mill (manufactured by Turbo Kogyo Co., Ltd.), or a fine pulverizer based on an air-jet system.

After that, the finely pulverized product is classified with a classifier or a sieving machine as required. The classifier or the sieving machine is, for example, Elbow-Jet (manufactured by Nittetsu Mining Co., Ltd.) of an inertial classification system, or Turboplex (manufactured by Hosokawa Micron Corporation), TSP Separator (manufactured by Hosokawa Micron Corporation), or Faculty (manufactured by Hosokawa Micron Corporation) of a centrifugal force classification system.

After that, the surface treatment of the toner particles by heating is performed to increase the circularity of the toner.

The surface treatment may be performed with hot air through use of, for example, a surface treatment apparatus illustrated in FIG. 1.

A mixture supplied in a constant amount by a raw material constant amount supply unit 1 is introduced into an introduction tube 3 arranged on the vertical line of a raw material supply unit by a compressed gas adjusted by a compressed gas-adjusting unit 2. The mixture that has passed through the introduction tube 3 is uniformly dispersed by a protruding member 4 of a conical shape arranged in the central portion of the raw material supply unit, is introduced into supply tubes 5 radially spreading in 8 directions, and is introduced into a treatment chamber 6 where heat treatment is performed.

At this time, the flow of the mixture supplied to the treatment chamber is regulated by a regulating unit 9 for regulating the flow of the mixture, the unit being arranged in the treatment chamber. Accordingly, the mixture supplied to the treatment chamber is heat-treated while swirling in the treatment chamber, and is then cooled.

The hot air for heat-treating the supplied mixture is supplied from a hot air supply unit 7, and the hot air is introduced into the treatment chamber while being caused to swirl spirally by swirling members 13 and 12 for causing the hot air to swirl.

With regard to the configuration of such member, the swirling member 13 for causing the hot air to swirl has a plurality of blades, and can control the swirling of the hot air in accordance with the number and angles of the blades. The temperature of the hot air supplied into the treatment chamber in the outlet portion 11 of the hot air supply unit 7 is preferably from 100° C. to 300° C. When the temperature in the outlet portion 11 of the hot air supply unit falls within the range, the toner particles can be uniformly subjected to sphering treatment while the melt adhesion and coalescence of the toner particles due to excessive heating of the mixture are suppressed.

Further, the heat-treated toner particles that have been heat-treated are cooled by cold air supplied from cold air supply units (8-1, 8-2, and 8-3). The temperature of the cold air supplied from the cold air supply units (8-1, 8-2, and 8-3) is preferably from −20° C. to 30° C. When the temperature of the cold air falls within the range, the heat-treated toner particles can be efficiently cooled, and hence the melt adhesion and coalescence of the heat-treated toner particles can be suppressed without inhibition of uniform sphering treatment of the mixture. The absolute moisture content of the cold air is preferably 0.5 g/m³ or more and 15.0 g/m³ or less.

Next, the heat-treated toner particles that have been cooled are recovered by a recovering unit 10 present at the lower end of the treatment chamber. The recovering unit has a configuration in which a blower (not shown) is arranged at its tip, and the particles are sucked and conveyed by the blower.

In addition, a powder particle supply port 14 is arranged so that the swirling direction of the supplied mixture and the swirling direction of the hot air may be the same direction, and the recovering unit 10 of the surface treatment apparatus is arranged in the outer peripheral portion of the treatment chamber so as to maintain the swirling direction of powder particles that have been caused to swirl. Further, the cold air supplied from the cold air supply units 8 is configured to be supplied from the outer peripheral portion of the apparatus to the inner peripheral surface of the treatment chamber from horizontal and tangential directions. All of the swirling direction of the toner particles supplied from the powder particle supply port 14, the swirling direction of the cold air supplied from the cold air supply units 8, and the swirling direction of the hot air supplied from the hot air supply unit 7 are the same direction. Accordingly, no turbulent flow occurs in the treatment chamber 6, and hence a swirling flow in the apparatus is strengthened. Thus, a strong centrifugal force is applied to the toner particles to further improve the dispersibility of the toner particles. Accordingly, toner particles having a small number of coalesced particles and having a uniform shape can be obtained.

The average circularity of the toner is preferably 0.960 or more and 0.980 or less because the non-electrostatic adhesive force thereof can be suppressed to a low level, and hence excellent fogging resistance can be obtained.

After that, the surfaces of the heat-treated toner particles are subjected to external addition treatment with an external additive, such as a plasticizer, as required. An example of a method for the external addition treatment is a method including stirring and mixing the particles and the external additive through use of a mixing apparatus as an external addition machine.

Examples of the mixing apparatus include a double cone mixer, a V-type mixer, a drum type mixer, a super mixer, a Henschel mixer, a Nauta mixer, MECHANO HYBRID (manufactured by Nippon Coke & Engineering Co., Ltd.), and NOBILTA (manufactured by Hosokawa Micro Corporation).

Methods of measuring various physical properties of the toner and raw materials therefor are described below.

<Measurement of Peak Molecular Weights and Weight-Average Molecular Weights of Binder Resin and Polymer Obtained by Graft Polymerization of Styrene Acrylic Polymer to Polyolefin by GPC>

The molecular weight distribution of the THF-soluble matter of the resin is measured by gel permeation chromatography (GPC) as described below.

First, the toner is dissolved in tetrahydrofuran (THF) at room temperature over 24 hours. Then, the resultant solution is filtered with a solvent-resistant membrane filter "Myshoridisk" (manufactured by Tosoh Corporation) having a pore diameter of 0.2 μm to provide a sample solution. The concentration of a THF-soluble component in the sample solution is adjusted to about 0.8 mass %. Measurement is performed with the sample solution under the following conditions.

Apparatus: HLC 8120 GPC (detector: RI) (manufactured by Tosoh Corporation)
Column: Septuplicate of Shodex KF-801, 802, 803, 804, 805, 806, and 807 (manufactured by Showa Denko K.K.)
Eluent: tetrahydrofuran (THF)
Flow rate: 1.0 mL/min
Oven temperature: 40.0° C.
Sample injection amount: 0.10 mL In the calculation of the molecular weight of the sample, a molecular weight calibration curve prepared with standard polystyrene resins is used.

Examples of the standard polystyrene resins include product names "TSK standard polystyrenes F-850, F-450, F-288, F-128, F-80, F-40, F-20, F-10, F-4, F-2, F-1, A-5000, A-2500, A-1000, and A-500" (manufactured by Tosoh Corporation).

<Measurement of Specific Resistance of Magnetic Carrier>

Figure 4:
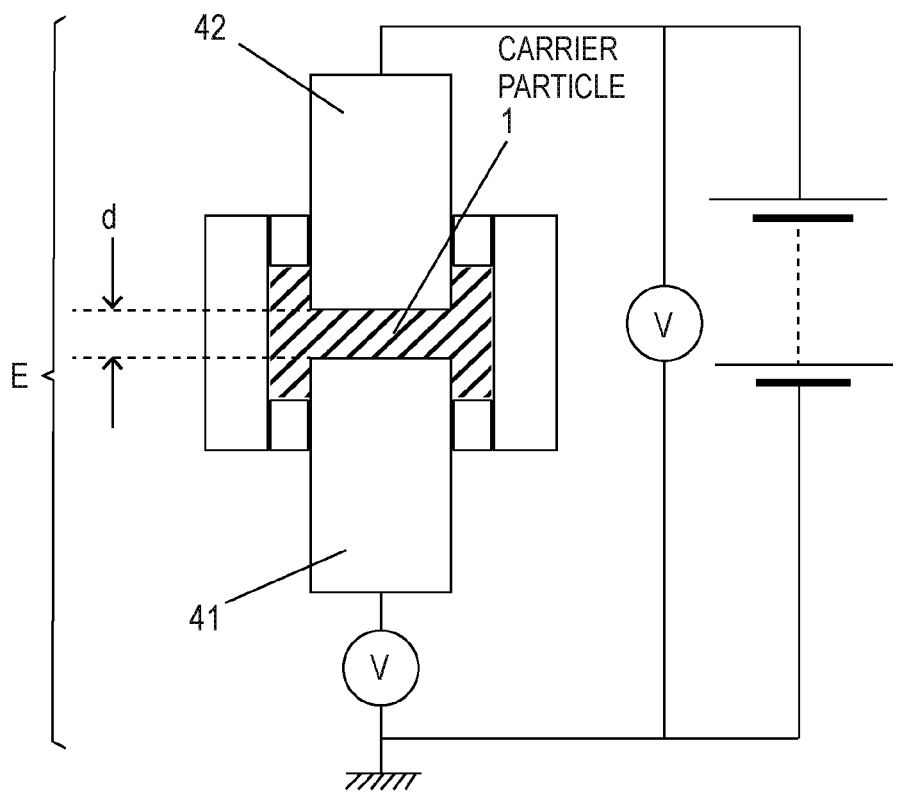
FIG. 4 is a schematic view of a specific resistance-measuring apparatus used in the present disclosure.

The specific resistance value of the magnetic carrier is measured with a measuring apparatus illustrated in FIG. 4.

The following method is used in the measurement of the specific resistance: magnetic carrier particles 1 are filled into a cell E; a lower electrode 41 and an upper electrode 42 are arranged so as to be in contact with the magnetic carrier particles 1; a voltage is applied between the electrodes; and the specific resistance is determined by measuring a current flowing at this time. Conditions for the measurement of the specific resistance are set as follows: the area S of contact between the filled magnetic carrier and each of the electrodes is about 2.4 cm², the thickness "d" of the sample is about 0.2 cm, and the load of the upper electrode is 240 g. Conditions for the application of the voltage are as follows: the voltage is applied in the order of application conditions (I), (II), and (III), and the current at the applied voltage in the application condition (III) is measured. After that, the thickness "d" of the sample was accurately measured, and the specific resistance (Ω·cm) in each electric field intensity (V/cm) was determined by calculation. The specific resistance in an electric field intensity of 3,000 V/cm was adopted as the specific resistance of the magnetic carrier serving as the sample.

Application Conditions
(I): The voltage is changed from 0 V to 1,000 V.: The voltage is increased in a stepwise manner every 30 seconds in increments of 200 V.
(II): The voltage is held at 1,000 V for 30 seconds.
(III): The voltage is changed from 1,000 V to 0 V.: The voltage is reduced in a stepwise manner every 30 seconds in increments of 200 V.

Specific resistance of magnetic carrier (Ω·cm)=(Applied voltage (V)/Measured current (A))×S (cm²)/d (cm)
Electric field intensity (V/cm)=Applied voltage (V)/d (cm)

EXAMPLES

<Production Example of Porous Magnetic Core Particles>
Step 1 (Weighing/mixing Step)
$Fe_2O_3$: 61.7 mass %
$MnCO_3$: 34.2 mass %
$Mg(OH)_2$: 3.0 mass %
$SrCO_3$: 1.1 mass %

Ferrite raw materials were weighed so that their contents (mass %) became those described above.

After that, the raw materials were pulverized and mixed with a dry ball mill using zirconia balls (each having a diameter of 10 mm) for 2 hours.

Step 2 (Pre-Calcining Step) After the pulverization and the mixing, the mixture was calcined in the air with a burner-type calcining furnace at 950° C. for 2 hours to produce a pre-calcined ferrite. The composition of the ferrite is as described below.

$$(MnO)_a(MgO)_b(SrO)_c(Fe_2O_3)_d$$

In the formula, a=0.40, b=0.07, c=0.01, and d=0.52.

Step 3 (Pulverizing Step)

The pre-calcined ferrite was pulverized to about 0.5 mm with a crusher, and then 30 parts by mass of water was added to 100 parts by mass of the pre-calcined ferrite, followed by the pulverization of the mixture with a wet ball mill using zirconia balls (each having a diameter of 1.0 mm) for 2 hours. After the balls had been separated, the pulverized product was pulverized with a wet bead mill using zirconia beads (each having a diameter of 1.0 mm) for 3 hours to provide a ferrite slurry.

Step 4 (Granulating Step) 2.0 Parts by mass of polyvinyl alcohol with respect to 100 parts by mass of the pre-calcined ferrite was added as a binder to the ferrite slurry, and the mixture was granulated with a spray dryer (manufacturer: Ohkawara Kakohki Co., Ltd.) into spherical particles having a volume-average particle diameter of 40 μm.

Step 5 (Calcining Step)

To control a calcining atmosphere, the spherical particles were calcined in an electric furnace under a nitrogen atmosphere (oxygen concentration: 1.0 vol %) at 1,150° C. for 4 hours.

Step 6 (Sorting Step)

After an agglomerated particle had been shredded, coarse particles were removed by sieving with a sieve having an aperture of 250 μm. Thus, porous magnetic core particles were obtained. The particles are adopted as a magnetic core 1.

The physical properties of the resultant magnetic core 1 are shown in Table 1.

Step 7 (Resin Filling Step)

100.0 Parts by mass of the magnetic core 1 was loaded into the stirring container of a mixing stirrer (universal stirrer model NDMV manufactured by Dalton Co., Ltd.). Then, while the temperature in the container was kept at 60° C., the pressure in the container was reduced to 2.3 kPa. During the decompression, nitrogen was introduced into the container, and a silicone resin solution was dropped under reduced pressure so that its amount in terms of a resin component was 7.5 parts by mass with respect to the magnetic core 1. After the completion of the dropping, the mixture was continuously stirred for 2 hours without being subjected to any other treatment. After that, the temperature was increased to 70° C., and the solvent was removed under reduced pressure. Thus, a silicone resin composition obtained from the silicone resin solution was filled into the particles of the magnetic core 1. After having been cooled, the resultant filled core particles were moved to a mixer having a spiral blade in a rotatable mixing container (drum mixer model UD-AT manufactured by Sugiyama Heavy Industrial Co., Ltd.), and their temperature was increased to 220° C. under a nitrogen atmosphere and normal pressure at a rate of temperature increase of 2 (° C./min). The resin was cured by heating and stirring the particles at the temperature for 60 minutes. After the heat treatment, a low-magnetic force product was separated by magnetic separation, and the remainder was classified with a sieve having an aperture of 150 μm. Thus, a magnetic core 2 was obtained.

The physical properties of the resultant magnetic core 2 are shown in Table 1.

<Production Example of Ferrite Core Particles>

Step 1 (Weighing/Mixing Step)

$Fe_2O_3$: 61.7 mass %
$MnCO_3$: 34.2 mass %
$Mg(OH)_2$: 3.0 mass %
$SrCO_3$: 1.1 mass %

Ferrite raw materials were weighed so that their contents (mass %) became those described above.

After that, the raw materials were pulverized and mixed with a dry ball mill using zirconia balls (each having a diameter of 10 mm) for 2 hours.

Step 2 (Pre-Calcining Step)

After the pulverization and the mixing, the mixture was calcined in the air with a burner-type calcining furnace at 1,000° C. for 2 hours to produce a pre-calcined ferrite. The composition of the ferrite is as described below.

$$(MnO)_a(MgO)_b(SrO)_c(Fe_2O_3)_d$$

In the formula, a=0.40, b=0.07, c=0.01, and d=0.52.

Step 3 (Pulverizing Step)

The pre-calcined ferrite was pulverized to about 0.5 mm with a crusher, and then 30 parts by mass of water was added to 100 parts by mass of the pre-calcined ferrite, followed by the pulverization of the mixture with a wet ball mill using stainless-steel balls (each having a diameter of 1.0 mm) for 2 hours. After the balls had been separated, the pulverized product was pulverized with a wet bead mill using stainless-steel balls (each having a diameter of 1.0 mm) for 3 hours to provide a ferrite slurry.

Step 4 (Granulating Step)

2.0 Parts by mass of polyvinyl alcohol with respect to 100 parts by mass of the pre-calcined ferrite was added as a binder to the ferrite slurry, and the mixture was granulated with a spray dryer (manufacturer: Ohkawara Kakohki Co., Ltd.) into spherical particles having a volume-average particle diameter of 45 μm.

Step 5 (Calcining Step)

To control a calcining atmosphere, the spherical particles were calcined in an electric furnace under a nitrogen atmosphere (oxygen concentration: 0.6 vol %) at 1,200° C. for 6 hours.

Step 6 (Sorting Step)

After an agglomerated particle had been shredded, coarse particles were removed by sieving with a sieve having an aperture of 250 μm. Thus, ferrite core particles were obtained. The particles are adopted as a magnetic core 3.

The physical properties of the resultant magnetic core 3 are shown in Table 1.

<Production Example of Magnetic Material-Dispersed Resin Core Particles>

Magnetite fine particles (spherical, number-average particle diameter: 250 nm) and a silane-based coupling agent (3-(2-aminoethylaminopropyl)trimethoxysilane) (whose amount was 3.0 mass % with respect to the mass of the magnetite fine particles) were introduced into a container. Then, the materials were mixed and stirred at high speed in the container at a temperature of 100° C. or more so that the surfaces of the magnetite fine particles were treated.

| | |
|---|---|
| Phenol | 10 parts by mass |
| Formaldehyde solution (37 mass % aqueous solution of formaldehyde) | 16 parts by mass |
| The above-mentioned surface-treated magnetite fine particles | 84 parts by mass |

The materials were introduced into a reaction tank and sufficiently mixed at a temperature of 40° C.

After that, the mixture was heated to a temperature of 85° C. at an average rate of temperature increase of 3 (° C./min) while being stirred, followed by the addition of 4 parts by mass of 28 mass % ammonia water and 25 parts by mass of water to the reaction tank. The mixture was held at a temperature of 85° C., and was subjected to a polymerization reaction for 3 hours to be cured. The peripheral speed of a stirring blade at this time was set to 1.8 (m/sec).

After the polymerization reaction, the resultant was cooled to a temperature of 30° C., and water was added thereto. The supernatant was removed, and the resultant precipitate was washed with water and air-dried. The resultant air-dried product was dried under reduced pressure (5 hPa or less) at a temperature of 60° C. to provide magnetic material-dispersed resin core particles. The particles are adopted as a magnetic core 4.

The physical properties of the resultant magnetic core 4 are shown in Table 1.

TABLE 1

| Magnetic core | 50% particle diameter on volume distribution(D50) (μm) | Apparent density (g/cm$^3$) | True density (g/cm$^3$) | Specific resistance in electric field intensity of 1,000 V/cm (Ω · cm) | Saturation magnetization (Am$^2$/kg) |
|---|---|---|---|---|---|
| 1 | 38 | 1.7 | 4.88 | $4.0 \times 10^7$ | 62 |
| 2 | 40 | 1.85 | 3.95 | $4.4 \times 10^7$ | 60 |
| 3 | 46 | 2.35 | 4.9 | $3.6 \times 10^7$ | 69 |
| 4 | 35 | 1.9 | 3.53 | $7.3 \times 10^{10}$ | 49 |

<Method of Producing Resin A1>

A fluorine-containing acrylic monomer corresponding to a first partial structure (first repeating structure) and a monomer corresponding to a second partial structure (second repeating structure) were added to a four-necked flask including a reflux condenser, a temperature gauge, a nitrogen suction tube, and a grinding-type stirring apparatus. The structures of the first partial structure and the second partial structure, and the loading amounts of the respective monomers are shown in Table 2A.

Further, 100 parts by mass of toluene, 100 parts by mass of methyl ethyl ketone, and 2.0 parts by mass of azobisisovaleronitrile were added to the flask. The resultant mixture was held in a stream of nitrogen at 70° C. for 10 hours to be subjected to a polymerization reaction. After the completion of the reaction, the resultant was repeatedly washed to provide a solution of a resin A1 (solid content: 35 mass %). The value of the $SPa_2$ of the second repeating structure is shown in Table 2A.

<Methods of Producing Resins A2 to A9>

Resins A2 to A9 were each obtained in the same manner as in the method of producing the resin A1 except that the structures of the first partial structure and the second partial structure, and the loading amounts of the respective monomers were changed as shown in Table 2A. The value of the $SPa_2$ of each of the second repeating structures is shown in Table 2A.

The ratio of the number of fluorine atoms to the sum of the number of hydrogen atoms, the number of the fluorine atoms, and the number of halogen atoms except the fluorine atoms in an alkyl group or a (poly)ether group in $R^2$ of the first partial structure (first repeating structure), and the ratio of the number of the halogen atoms except the fluorine atoms to the sum are shown in Table 2B.

TABLE 2A

| Resin A | First partial structure | | | | Second partial structure | | | | | Others | |
|---|---|---|---|---|---|---|---|---|---|---|---|
| | $R^1$ | $R^2$ | $X^1$ | Loading amount (wt. %) | $R^3$ | $R^4$ | $X^2$ | Loading amount (wt. %) | $SPa_2$ | Monomer | Loading amount (wt. %) |
| A1 | Methyl group | —(CH$_2$)$_2$—(CF$_2$)$_5$—CF$_3$ | —COO— | 93 | Methyl group | —O— | Methyl group | 7 | 9.91 | Absent | 0 |
| A2 | Methyl group | —(CH$_2$)$_2$—CF$_2$—CFCF$_3$—(CF$_2$)$_3$—CF$_3$ | —COO— | 93 | Methyl group | —O— | Methyl group | 7 | 9.91 | Absent | 0 |
| A3 | Methyl group | —(CH$_2$)$_2$—(CH$_2$CF$_2$)$_3$—CF$_3$ | —COO— | 93 | Methyl group | —O— | Methyl group | 7 | 9.91 | Absent | 0 |
| A4 | Methyl group | —(CH$_2$)$_2$—(CF$_2$—CFCl—(CH$_2$)$_2$)$_2$—CF$_3$ | —COO— | 93 | Methyl group | —O— | Methyl group | 7 | 9.91 | Absent | 0 |
| A5 | Methyl group | —(CH$_2$)$_2$—(CF$_2$)$_5$—CF$_3$ | —COO— | 88.1 | Methyl group | —O— | n-Hexyl group | 11.9 | 9.34 | Absent | 0 |
| A6 | Methyl group | —(CH$_2$)$_2$—(CF$_2$)$_5$—CF$_3$ | —COO— | 80.3 | Methyl group | —O— | n-Tetradecyl group | 19.7 | 8.95 | Absent | 0 |
| A7 | Methyl group | —(CH$_2$)$_2$—(CF$_2$)$_5$—CF$_3$ | —COO— | 93 | Methyl group | —O— | Methyl group | 3.5 | 9.91 | Styrene | 3.5 |
| A8 | Methyl group | —(CH$_2$)$_2$—(CF$_2$)$_5$—CF$_3$ | —COO— | 93 | — | — | — | 0 | — | Styrene | 7 |
| A9 | Methyl group | —CF$_3$ | —COO— | 93 | Methyl group | —O— | Methyl group | 7 | 9.91 | Absent | 0 |

TABLE 2B

| | Alkyl group or (poly)ether group represented by $R^2$ | |
|---|---|---|
| Resin A | Ratio (atomic %) of number of fluorine atoms | Ratio (atomic %) of number of halogen atoms except fluorine atoms |
| A1 | 52.0 | 0.0 |
| A2 | 53.6 | 0.0 |
| A3 | 32.1 | 0.0 |
| A4 | 26.5 | 2.9 |
| A5 | 52.0 | 0.0 |
| A6 | 52.0 | 0.0 |
| A7 | 52.0 | 0.0 |
| A8 | 52.0 | 0.0 |
| A9 | 75.0 | 0.0 |

<Method of Producing Macromonomer>

A macromonomer to be used in a resin B may be synthesized by, for example, the following approach.

The following raw materials were added to a four-necked flask including a reflux condenser, a temperature gauge, a nitrogen suction tube, and a grinding-type stirring apparatus.

| Methacryloyl chloride | 1.7 mass % |
|---|---|
| Polymethyl methacrylate having a hydroxy group at one terminal thereof (Mw; about 5,000) | 98.3 mass % |

Further, 100 parts by mass of THF and 1.0 part by mass of 4-tert-butylcatechol were added to the flask, and the mixture was heated to reflux for 5 hours in a stream of nitrogen. After the completion of the reaction, the resultant was washed with sodium hydrogen carbonate to provide a solution of the macromonomer.

<Method of Producing Resin B1>

The following monomers and the macromonomer were added to a four-necked flask including a reflux condenser, a temperature gauge, a nitrogen suction tube, and a grinding-type stirring apparatus.

| Cyclohexyl methacrylate | 74.5 mass % |
|---|---|
| Methyl methacrylate | 0.5 mass % |
| Methacrylic acid macromonomer | 25.0 mass % |

Further, 100 parts by mass of toluene, 100 parts by mass of methyl ethyl ketone, and 2.0 parts by mass of azobisisovaleronitrile were added to the flask. The resultant mixture was held in a stream of nitrogen at 70° C. for 10 hours to be subjected to a polymerization reaction. After the completion of the reaction, the resultant was repeatedly washed to provide a solution of a resin B1 (solid content: 35 mass %). The weight-average molecular weight of the solution measured by gel permeation chromatography (GPC) was 57,000. The value of the $SPb_3$ of the third repeating structure of the resin is 10.6.

<Method of Producing Resin B2>

The following monomers and the macromonomer were added to a four-necked flask including a reflux condenser, a temperature gauge, a nitrogen suction tube, and a grinding-type stirring apparatus.

| Methyl methacrylate | 75 mass % |
|---|---|
| Methacrylic acid macromonomer | 25 mass % |

Further, 100 parts by mass of toluene, 100 parts by mass of methyl ethyl ketone, and 2.0 parts by mass of azobisisovaleronitrile were added to the flask. The resultant mixture was held in a stream of nitrogen at 70° C. for 10 hours to be subjected to a polymerization reaction. After the completion of the reaction, the resultant was repeatedly washed to provide a solution of a resin B2 (solid content: 35 mass %). The weight-average molecular weight of the solution measured by gel permeation chromatography (GPC) was 35,000. The value of the $SPb_3$ of the third repeating structure of the resin is 9.91.

<Method of Producing Resin B3>

The following monomers and the macromonomer were added to a four-necked flask including a reflux condenser, a temperature gauge, a nitrogen suction tube, and a grinding-type stirring apparatus.

| Cyclohexyl acrylate | 75 mass % |
|---|---|
| Methacrylic acid macromonomer | 25 mass % |

Further, 100 parts by mass of toluene, 100 parts by mass of methyl ethyl ketone, and 2.0 parts by mass of azobisisovaleronitrile were added to the flask. The resultant mixture was held in a stream of nitrogen at 70° C. for 10 hours to be subjected to a polymerization reaction. After the completion of the reaction, the resultant was repeatedly washed to provide a solution of a resin B3 (solid content: 35 mass %). The weight-average molecular weight of the solution measured by gel permeation chromatography (GPC) was 55,000. The value of the $SPb_3$ of the third repeating structure of the resin is 11.5.

<Method of Producing Resin B4>

50 Parts of xylene was loaded into an autoclave, and the inside of the autoclave was purged with nitrogen. After that, a temperature in the autoclave was increased to 185° C. under stirring in a sealed state. While the temperature in the autoclave was controlled to 185° C., a mixed solution of 100 parts of styrene, 50 parts of di-t-butyl peroxide, and 50 parts of xylene was continuously dropped for 3 hours to perform polymerization. The polymerized product was further kept at the temperature for 1 hour so that the polymerization was completed. Thus, a solution of a resin B4 (solid content: 50 mass %) was obtained. The weight-average molecular weight of the solution measured by gel permeation chromatography (GPC) was 5,000.

<Resin Coating Step>

Method of Producing Magnetic Carrier 1

The magnetic core 3 shown in Table 1 above was used, and a resin solution having composition shown in Table 3 was loaded into a planetary-screw mixer maintained at a temperature of 60° C. under reduced pressure (1.5 kPa) so that its amount in terms of the solid content of resin components became 2.0 parts by mass with respect to 100 parts by mass of the magnetic core. Nauta Mixer Model VN manufactured by Hosokawa Micron Corporation was used as the planetary-screw mixer.

How to load the resin solution is as described below. One third of the amount of the resin solution was loaded, and solvent removal and an applying operation were performed for 20 minutes. Next, another one third of the amount of the resin solution was loaded, and the solvent removal and the applying operation were performed for 20 minutes. Further, the remaining one third of the amount of the resin solution was loaded, and the solvent removal and the applying operation were performed for 20 minutes.

After that, the magnetic carrier coated with the coating resin composition was moved to a mixer having a spiral blade in a rotatable mixing container (drum mixer model UD-AT manufactured by Sugiyama Heavy Industrial Co., Ltd.). The magnetic carrier was heat-treated at a temperature of 120° C. under a nitrogen atmosphere for 2 hours while being stirred by rotating the mixing container 10 times per 1 minute. A low-magnetic force product was separated from the resultant magnetic carrier 1 by magnetic separation, and the remainder was passed through a sieve having an aperture of 150 μm, followed by classification with an air classifier. Thus, a magnetic carrier 1 having a 50% particle diameter (D50) on a volume distribution basis of 39.1 μm was obtained.

The analysis results of the resultant magnetic carrier 1 are shown in Table 4.

Methods of Producing Magnetic Carriers 2 to 18

Magnetic carriers 2 to 18 were each obtained in the same manner as in the method of producing the magnetic carrier 1 except that the resins and the magnetic core to be loaded were changed as shown in Table 3. The analysis results of the carriers are shown in Table 4.

Method of Producing Magnetic Carrier 19

A magnetic carrier 19 was obtained in the same manner as in the method of producing the magnetic carrier 1 except that the resin solution was loaded so that its amount in terms of the solid content of the resin components became 1.0 part by mass with respect to 100 parts by mass of the magnetic core. The analysis results of the carrier are shown in Table 4.

Method of Producing Magnetic Carrier 20

A magnetic carrier 20 was obtained in the same manner as in the method of producing the magnetic carrier 1 except that the resin solution was loaded so that its amount in terms of the solid content of the resin components became 0.5 part by mass with respect to 100 parts by mass of the magnetic core. The analysis results of the carrier are shown in Table 4.

Method of Producing Magnetic Carrier 21

A magnetic carrier 21 was obtained in the same manner as in the method of producing the magnetic carrier 18 except that the resin solution was loaded so that its amount in terms of the solid content of the resin components became 1.9 parts by mass with respect to 100 parts by mass of the magnetic core. The analysis results of the carrier are shown in Table 4.

Method of Producing Magnetic Carrier 22

100 Parts by mass of the magnetic carrier 21 and 0.1 part by mass of polytetrafluoroethylene resin fine particles (PTFE, TLP10F-1 (manufactured by Dupont-Mitsui Fluorochemicals Co., Ltd.)) were loaded into NOBILTA (manufactured by Hosokawa Micron Corporation). Then, as a preliminary mixing step, the materials were stirred and mixed for 2 minutes while the outermost end peripheral speed of a stirring member was set to 1 m/sec. After that, while the outermost end peripheral speed of the stirring member was adjusted to 10 m/sec, coating treatment was performed for 15 minutes to provide magnetic carrier particles. A low-magnetic force product was separated from the resultant magnetic carrier particles by magnetic separation, and the remainder was passed through a sieve having an aperture of 150 μm, followed by classification with an air classifier. Thus, a magnetic carrier 22 having a 50% particle diameter (D50) on a volume distribution basis of 40.8 μm was obtained. The analysis results of the carrier are shown in Table 4.

TABLE 3

| Magnetic carrier | Carrier core | Resin A Kind of resin | Resin A Loading amount (wt. %) | Resin B Kind of resin | Resin B Loading amount (wt. %) | SP value $SPa_2$ | SP value $SPb_3$ | SP value $\|SPa_2 - SPb_3\|$ |
|---|---|---|---|---|---|---|---|---|
| 1 | 3 | A1 | 5 | B1 | 95 | 9.91 | 10.6 | 0.69 |
| 2 | 3 | A2 | 5 | B1 | 95 | 9.91 | 10.6 | 0.69 |
| 3 | 3 | A3 | 5 | B1 | 95 | 9.91 | 10.6 | 0.69 |
| 4 | 3 | A4 | 5 | B1 | 95 | 9.91 | 10.6 | 0.69 |
| 5 | 2 | A1 | 5 | B1 | 95 | 9.91 | 10.6 | 0.69 |
| 6 | 4 | A1 | 5 | B1 | 95 | 9.91 | 10.6 | 0.69 |
| 7 | 3 | A1 | 5 | B2 | 95 | 9.91 | 9.91 | 0 |
| 8 | 3 | A5 | 5 | B3 | 95 | 9.34 | 11.5 | 2.16 |
| 9 | 3 | A6 | 5 | B3 | 95 | 8.95 | 11.5 | 2.55 |
| 10 | 3 | A1 | 5 | B1 B4 | 42.5 42.5 | 9.91 | 10.6 | 0.69 |
| 11 | 3 | A1 | 5 | B4 | 95 | 9.91 | — | — |
| 12 | 3 | A7 | 5 | B1 | 95 | 9.91 | 10.6 | 0.69 |
| 13 | 3 | A8 | 5 | B1 | 95 | 9.91 | 10.6 | 0.69 |
| 14 | 3 | A1 | 1 | B1 | 99 | 9.91 | 10.6 | 0.69 |
| 15 | 3 | A1 | 50 | B1 | 50 | 9.91 | 10.6 | 0.69 |
| 16 | 3 | A9 | 5 | B1 | 95 | 9.91 | 10.6 | 0.69 |
| 17 | 3 | A1 | 100 | B1 | 0 | 9.91 | — | — |
| 18 | 3 | A1 | 0 | B1 | 100 | — | 10.6 | — |

TABLE 4

| Magnetic carrier | F(0) | F(10) | F(20) | Maximum value of $\|F(x + 1) - F(x)\|$ $(0 \leq x \leq 20)$ | C(0) | C(20) | F(0)/ C(0) | F(20)/ C(20) | Maximum value of $\|F(x + 1)/C(x + 1) - F(x)/C(x)\|$ $(0 \leq x \leq 20)$ | Average thickness (nm) of resin coating layer |
|---|---|---|---|---|---|---|---|---|---|---|
| 1 | 9.88 | 3.87 | 2.96 | 4.77 | 67.72 | 68.42 | 0.142 | 0.041 | 0.051 | 147.2 |
| 2 | 9.80 | 3.86 | 2.90 | 4.95 | 67.48 | 69.10 | 0.143 | 0.042 | 0.048 | 155.2 |

TABLE 4-continued

| Magnetic carrier | F(0) | F(10) | F(20) | Maximum value of \|F(x + 1) − F(x)\| (0 ≤ x ≤ 20) | C(0) | C(20) | F(0)/ C(0) | F(20)/ C(20) | Maximum value of \|F(x + 1)/ C(x + 1) − F(x)/C(x)\| (0 ≤ x ≤ 20) | Average thickness (nm) of resin coating layer |
|---|---|---|---|---|---|---|---|---|---|---|
| 3 | 9.59 | 3.80 | 2.95 | 5.00 | 65.84 | 68.11 | 0.142 | 0.042 | 0.050 | 150.6 |
| 4 | 9.82 | 3.86 | 2.89 | 4.76 | 65.38 | 68.12 | 0.141 | 0.041 | 0.050 | 142.5 |
| 5 | 9.00 | 3.48 | 2.44 | 4.76 | 66.56 | 66.80 | 0.129 | 0.035 | 0.051 | 114.2 |
| 6 | 8.70 | 3.44 | 2.41 | 4.41 | 66.55 | 67.26 | 0.126 | 0.035 | 0.049 | 127.1 |
| 7 | 9.83 | 3.85 | 2.96 | 4.43 | 65.09 | 68.15 | 0.143 | 0.043 | 0.050 | 155.9 |
| 8 | 9.96 | 3.82 | 2.98 | 4.99 | 65.22 | 69.42 | 0.145 | 0.042 | 0.049 | 147.1 |
| 9 | 9.51 | 3.81 | 2.92 | 4.83 | 66.22 | 68.17 | 0.143 | 0.041 | 0.050 | 150.1 |
| 10 | 9.83 | 3.87 | 2.86 | 4.95 | 67.71 | 68.27 | 0.144 | 0.042 | 0.050 | 149.2 |
| 11 | 9.59 | 3.81 | 2.87 | 4.86 | 67.62 | 68.38 | 0.143 | 0.042 | 0.051 | 156.6 |
| 12 | 9.83 | 3.93 | 2.96 | 4.86 | 67.34 | 66.57 | 0.142 | 0.041 | 0.049 | 143.5 |
| 13 | 9.84 | 3.88 | 2.95 | 4.95 | 67.62 | 67.71 | 0.145 | 0.042 | 0.050 | 154.5 |
| 14 | 5.22 | 2.02 | 1.03 | 2.58 | 76.36 | 75.57 | 0.071 | 0.014 | 0.031 | 143.4 |
| 15 | 14.25 | 7.76 | 3.96 | 5.99 | 65.65 | 65.31 | 0.219 | 0.058 | 0.145 | 157.0 |
| 16 | 3.96 | 0.98 | 1.00 | 1.92 | 69.24 | 71.84 | 0.057 | 0.013 | 0.027 | 147.8 |
| 17 | 9.70 | 9.50 | 9.79 | 0.10 | 57.62 | 59.23 | 0.162 | 0.163 | 0.019 | 155.5 |
| 18 | 0.10 | 0.10 | 0.10 | 0.00 | 67.95 | 65.90 | 0.001 | 0.001 | 0.000 | 155.6 |
| 19 | 9.84 | 3.86 | 2.98 | 6.73 | 65.80 | 69.63 | 0.147 | 0.043 | 0.049 | 78.2 |
| 20 | 9.94 | 2.93 | 2.38 | 6.61 | 67.45 | 66.53 | 0.142 | 0.035 | 0.060 | 38.6 |
| 21 | 0.10 | 0.10 | 0.10 | 0.00 | 66.26 | 65.77 | 0.001 | 0.001 | 0.000 | 146.3 |
| 22 | 30.94 | 0.97 | 0.95 | 22.15 | 53.49 | 63.41 | 0.566 | 0.015 | 0.458 | 151.1 |

| <Production Example of Toner 1> | |
|---|---|
| Polyester resin | 100 parts |
| Fischer-Tropsch wax (peak temperature of highest endothermic peak: 90° C.) | 4 parts |
| Aluminum 3,5-di-t-butylsalicylate compound (BONTRON E88 manufactured by Orient Chemical Industries Co., Ltd.) | 0.3 part |
| Carbon black | 10 parts |

The materials were mixed with a Henschel mixer (Model FM-75 manufactured by Mitsui Mining Co., Ltd.) at a number of revolutions of 1,500 rpm for a time of revolution of 5 minutes, and thereafter, the mixture was kneaded with a twin screw kneader (Model PCM-30 manufactured by Ikegai Corp.) whose temperature was set to 130° C. The kneaded product thus obtained was cooled and coarsely pulverized with a hammer mill to 1 mm or less to provide a coarsely pulverized product. The coarsely pulverized product thus obtained was finely pulverized with a mechanical pulverizer (T-250 manufactured by Turbo Kogyo Co., Ltd.). Further, the finely pulverized product was classified with Faculty (F-300 manufactured by Hosokawa Micron Corporation) to provide toner base particles 1. Operating conditions were as follows: the number of revolutions of a classification rotor was set to 11,000 rpm and the number of revolutions of a dispersion rotor was set to 7,200 rpm.

| Toner base particles 1 | 100 parts |
|---|---|
| Silica fine particles A (having a number-average particle diameter (D1) of 120 nm) | 2.0 parts |

The raw materials represented by the above-mentioned formulations were mixed with a Henschel mixer (Model FM-10C manufactured by Mitsui Mining Co., Ltd.) at a number of revolutions of 1,900 rpm for a time of revolution of 3 minutes. After that, the mixture was heat-treated with the surface treatment apparatus illustrated in FIG. 1 to provide heat-treated toner particles 1. Operating conditions were set as follows: a feeding amount was 5 kg/hr, a hot air temperature C was 160° C., a hot air flow rate was 6 m³/min., a cold air temperature E was −5° C., a cold air flow rate was 4 m³/min., a blower airflow rate was 20 m³/min., and an injection air flow rate was 1 m³/min.

The resultant heat-treated toner particles were classified with Elbow-Jet (manufactured by Nittetsu Mining Co., Ltd.) of an inertial classification system so that heat-treated toner particles each having a desired particle diameter were obtained.

| Heat-treated toner particles 1 | 100 parts |
|---|---|
| Silica fine particles B (having a number-average particle diameter (D1) of 20 nm) | 0.6 part |

The above-mentioned materials were mixed with a Henschel mixer (Model FM-75 manufactured by Mitsui Miike Chemical Engineering Machinery, Co., Ltd.) at a number of revolutions of 1,900 rpm for a time of revolution of 3 minutes to provide a toner 1.

Example 1

9 Parts by mass of the toner 1 was added to 91 parts by mass of the magnetic carrier 1, and the mixture was shaken with a shaker (Model YS-8D: manufactured by Yayoi) to prepare 300 g of a two-component developer. The shaking with the shaker was performed under the conditions of 150 rpm and 2 minutes.

Meanwhile, 90 parts by mass of the toner 1 was added to 10 parts by mass of the magnetic carrier 1, and the materials were mixed for 5 minutes with a V-type mixer in a normal-temperature and normal-humidity environment (temperature: 23° C./relative humidity: 50%) to provide a developer for replenishment.

The following evaluations were performed by using the two-component developer and the developer for replenishment.

A reconstructed machine of a color copying machine "imageRUNNER ADVANCE C5560" manufactured by Canon Inc. was used as an image-forming apparatus.

The two-component developer was loaded into the developing unit for each color of the machine, and a container for a developer for replenishment containing the developer for replenishment of each color was set in the unit. An image was formed with the machine, and various evaluations before and after a paper passing endurance test were performed.

As the paper passing endurance test, a chart for outputting an FFH image having an image ratio of 40% was used under a printing environment having a temperature of 30° C. and a relative humidity of 80% (hereinafter referred to as "H/H"). The symbol "FFH" refers to one of the values obtained by representing 256 levels of gray in hexadecimal notation. 00 h corresponds to the first level of gray (white portion) of the 256 levels of gray, and the FFH corresponds to the 256th level of gray (solid portion) of the 256 levels of gray.

The number of images to be output was changed in accordance with each evaluation item.

Conditions:
- Paper: Laser beam printer paper CS-814 (81.4 g/m²) (Canon Marketing Japan Inc.)
- Image-forming speed: The machine was reconstructed so as to be capable of outputting a full-color image on 80 sheets of A4 size paper per minute.
- Development conditions: The machine was reconstructed so that its development contrast was able to be adjusted to an arbitrary value and automatic correction by its main body was not activated. The machine was reconstructed so that the frequency of an AC electric field was 2.0 kHz, and the peak-to-peak voltage (Vpp) thereof was able to be changed from 0.7 kV to 1.8 kV in increments of 0.1 kV. The machine was reconstructed so as to be capable of outputting an image with each color alone.

Respective evaluation items are described below. The results of the evaluations are shown in Table 6. With regard to measurement involving a measurement error, the measurement was repeated such a number of times that the measurement error became sufficiently small. The arithmetic average of the measured values was adopted as a measured value.

(1) Image Density

After image output evaluations (A4 horizontal, print percentage: 40%, 50,000 sheets) had been performed under the H/H environment at the initial stage of the endurance and after the endurance, a solid image (FFH) was output. Density measurement was performed with a densitometer X-Rite 404A (manufactured by X-Rite Inc.), and the average of 6 measured values was adopted as an image density. A difference between the image densities of the image at the initial stage of the endurance and the image output after the endurance was judged by the following criteria.
- A: The density difference is less than 0.10.
- B: The density difference is 0.10 or more and less than 0.15.
- C: The density difference is 0.15 or more and less than 0.20.
- D: The density difference is 0.20 or more and less than 0.25.
- E: The density difference is 0.25 or more and less than 0.30.

(2) Toner Scattering

After image output evaluations (A4 horizontal, print percentage: 40%, 50,000 sheets) had been performed under the H/H environment at the initial stage of the endurance and after the endurance, the developing unit was removed from the inside of the main body, and the scattering states of the toner inside and outside the developing unit and the main body were visually observed and evaluated by the following criteria.
- A: No toner scattering occurs.
- B: Extremely slight toner scattering occurs.
- C: Slight toner scattering occurs.
- D: Toner scattering occurs.
- E: Serious toner scattering occurs.

(3) Wear Resistance of Coating Resin

Image output evaluations (A4 horizontal, print percentage: 0%, 100,000 sheets) were performed under the H/H environment at the initial stage of the endurance and after the endurance. After that, the developer was removed from the inside of the main body, and 1 g of the developer or the developer before the endurance, 30 mL of distilled water, and 0.1 mL of Contaminon N below were loaded into a 100-milliliter flat-bottom beaker made of glass. The mixture was subjected to ultrasonic cleaning for 1 minute, and then the supernatant was removed; the foregoing operation was repeated three times. Then, the resultant residue was dried in a dryer at 50° C. for 24 hours to provide a magnetic carrier sample. The specific resistance of the resultant magnetic carrier sample was measured, and the ratio at which the measured value after the endurance evaluation changed as compared to that before the endurance evaluation was judged in light of the following criteria.

Contaminon N: A 10 mass % aqueous solution of a neutral detergent for washing a precision measuring unit formed of a nonionic surfactant, an anionic surfactant, and an organic builder, and having a pH of 7, manufactured by Wako Pure Chemical Industries, Ltd.
- A: The specific resistance is reduced by the endurance by less than 5% as compared to that before the endurance.
- B: The specific resistance is reduced by the endurance by 5% or more and less than 15% as compared to that before the endurance.
- C: The specific resistance is reduced by the endurance by 15% or more and less than 30% as compared to that before the endurance.
- D: The specific resistance is reduced by the endurance by 30% or more and less than 40% as compared to that before the endurance.
- E: The specific resistance is reduced by the endurance by 40% or more as compared to that before the endurance.

When any one of the evaluations A to C, which were equal to or more than those of related-art products, was obtained for each of the evaluation items (1) to (3), it was judged that the effect of the present disclosure was obtained.

Examples 2 to 16 and Comparative Examples 1 to 5

Evaluations were performed in the same manner as in Example 1 except that the magnetic carrier 1 was changed to those shown in Table 5. The results of the evaluations are shown in Table 6.

TABLE 5

| Example or Comparative Example | Toner | Magnetic carrier |
|---|---|---|
| Example 1 | 1 | 1 |
| Example 2 | 1 | 2 |
| Example 3 | 1 | 3 |
| Example 4 | 1 | 4 |

TABLE 5-continued

| Example or Comparative Example | Toner | Magnetic carrier |
|---|---|---|
| Example 5 | 1 | 5 |
| Example 6 | 1 | 6 |
| Example 7 | 1 | 7 |
| Example 8 | 1 | 8 |
| Example 9 | 1 | 9 |
| Example 10 | 1 | 10 |
| Example 11 | 1 | 11 |
| Example 12 | 1 | 12 |
| Example 13 | 1 | 13 |
| Example 14 | 1 | 14 |
| Example 15 | 1 | 15 |
| Example 16 | 1 | 19 |
| Comparative Example 1 | 1 | 20 |
| Comparative Example 2 | 1 | 22 |
| Comparative Example 3 | 1 | 16 |
| Comparative Example 4 | 1 | 17 |
| Comparative Example 5 | 1 | 18 |

TABLE 6

| Example or Comparative Example | Evaluation (1) Image density | Evaluation (2) Toner scattering | Evaluation (3) Wear resistance of coating resin |
|---|---|---|---|
| Example 1 | A \| 0.081 | A | A \| 2% |
| Example 2 | A \| 0.085 | A | A \| 2% |
| Example 3 | A \| 0.089 | A | A \| 3% |
| Example 4 | A \| 0.084 | A | A \| 2% |
| Example 5 | A \| 0.080 | A | A \| 1% |
| Example 6 | A \| 0.090 | A | A \| 4% |
| Example 7 | A \| 0.092 | A | B \| 8% |
| Example 8 | A \| 0.096 | A | B \| 11% |
| Example 9 | B \| 0.105 | A | C \| 16% |
| Example 10 | B \| 0.112 | A | B \| 12% |
| Example 11 | B \| 0.122 | B | C \| 20% |
| Example 12 | B \| 0.125 | A | B \| 14% |
| Example 13 | B \| 0.132 | B | C \| 28% |
| Example 14 | C \| 0.156 | C | A \| 4% |
| Example 15 | A \| 0.098 | B | C \| 17% |
| Example 16 | B \| 0.132 | B | C \| 26% |
| Comparative Example 1 | C \| 0.168 | C | E \| 43% |
| Comparative Example 2 | D \| 0.236 | D | C \| 25% |
| Comparative Example 3 | D \| 0.223 | D | B \| 10% |
| Comparative Example 4 | B \| 0.126 | C | E \| 44% |
| Comparative Example 5 | E \| 0.289 | D | C \| 17% |

According to the present disclosure, there can be provided the magnetic carrier, which is suppressed from causing the loss and wear of the magnetic carrier coating resin even when used for a long time period, and achieves a stable image density and a reduction in toner scattering, and the two-component developer and the developer for replenishment each using the carrier.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-009915, filed Jan. 25, 2021, which is hereby incorporated by reference herein in its entirety.

What is claimed is:

1. A magnetic carrier comprising:
a magnetic carrier particle including
a magnetic core, and
a resin coating layer configured to coat a surface of the magnetic core,
wherein the resin coating layer contains a coating resin, the coating resin contains
a resin A having a fluorine polymer moiety, and
a resin B having a third repeating structure represented by formula (10):

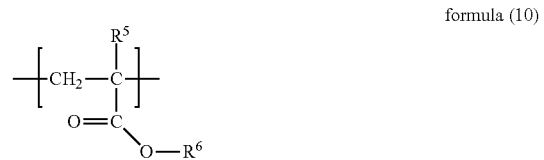

formula (10)

where $R^5$ represents hydrogen or a methyl group, and $R^6$ represents an alicyclic hydrocarbon group,
wherein a content ratio of the resin A in the coating resin is 3 mass % or more and 20 mass % or less, and
wherein the resin coating layer has an average thickness of 50 nm or more,
wherein when a concentration of a nitrogen atom, a concentration of a silicon atom, a concentration of a fluorine atom, a concentration of a carbon atom, a concentration of a titanium atom, a concentration of a strontium atom, a concentration of a tin atom, a concentration of an aluminum atom, and a concentration of an oxygen atom detected at a position at a depth of x nm from a surface of the magnetic carrier particle by X-ray photoelectron spectroscopy are represented by dN(x), dSi(x), dF(x), dC(x), dTi(x), dSr(x), dSn(x), dAl(x), and dO(x), respectively, a ratio F(x) (atomic %) of the fluorine atom represented by equation (A) satisfies formula (1) and formula (2), and
wherein x represents an integer of 0 or more and 20 or less, and F(x) satisfies formula (3):

$F(x)=dF(x)/[dN(x)+dSi(x)+dF(x)+dC(x)+dTi(x)+dSr(x)+dSn(x)+dAl(x)+dO(x)]\times 100$ (A)

$5.0 \leq F(0) \leq 15$ (1)

$F(20) \leq 5.0$ (2)

$|F(x+1)-F(x)| \leq 7.5$ (3).

2. The magnetic carrier according to claim 1, wherein a ratio C (x) (atomic %) of the carbon atom represented by equation (B) and F (x) (atomic %) satisfy formula (4) and formula (5), and wherein F (x) and C (x) satisfy formula (6):

$C(x)=dC(x)/[dN(x)+dSi(x)+dF(x)+dC(x)+dTi(x)+dSr(x)+dSn(x)+dAl(x)+dO(x)]\times 100$ (B)

$0.060 \leq F(0)/C(0) \leq 0.30$ (4)

$F(20)/C(20) \leq 0.060$ (5)

$|F(x+1)/C(x+1)-F(x)/C(x)| \leq 0.15$ (6).

3. The magnetic carrier according to claim 1, wherein the F(x) satisfies formula (7):

$F(10) \leq 8.0$ (7).

4. The magnetic carrier according to claim 1,
wherein a content of the resin A in the resin coating layer is 1.0 mass % or more and 50 mass % or less, and
wherein the resin A has a first repeating structure represented by formula (8):

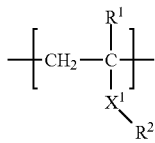

formula (8)

in formula (8),
$R^1$ represents hydrogen or a methyl group,
$X^1$ represents COO or O,
$R^2$ represents an alkyl group having 1 to 20 carbon atoms or a (poly) ether group,
part or all of hydrogen atoms of the alkyl group or the (poly) ether group are each substituted with a fluorine atom,
part of the remaining hydrogen atoms may each be substituted with a halogen atom except a fluorine atom,
a ratio of the number of the fluorine atoms to a sum of the number of the hydrogen atoms, the number of the fluorine atoms, and the number of the halogen atoms except the fluorine atoms in the alkyl group or the (poly) ether group is 5.0 atomic % or more, and
a ratio of the number of the halogen atoms except the fluorine atoms to the sum of the number of the hydrogen atoms, the number of the fluorine atoms, and the number of the halogen atoms except the fluorine atoms in the alkyl group or the (poly) ether group is 40 atomic % or less.

5. The magnetic carrier according to claim 4, wherein the first repeating structure represented by formula (8) of the resin A has any one of structures represented by formulae (8-1) to (8-4):

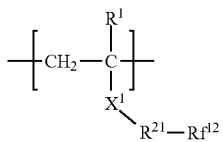

formulae (8-1)

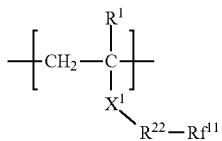

formulae (8-2)

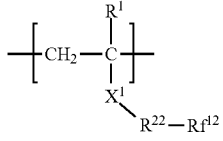

formulae (8-3)

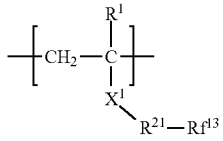

formulae (8-4)

in formulae (8-1) to (8-4),
$R^1$ represents hydrogen or a methyl group,
$X^1$ represents COO or O,
$R^{21}$ represents a single bond or an alkylene group,
$R^{22}$ represents an alkylene group having tertiary carbon,
$Rf^{11}$ represents a monovalent group having at least a fluoroalkyl group,
$Rf^{12}$ represents a fluoroalkyl group having tertiary carbon or quaternary carbon, and
$Rf^{13}$ represents a perfluoroalkyl group having 4 to 6 carbon atoms.

6. The magnetic carrier according to claim 1, wherein the resin A has a second repeating structure represented by formula (9):

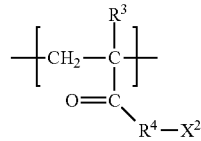

formula (9)

where $R^3$ represents H or a methyl group, $R^4$ represents a divalent organic group, and $X^2$ represents a hydrocarbon group having 1 to 12 carbon atoms, or a polymer containing, as a polymerization component, at least one kind of compound selected from the group consisting of an acrylate, a methacrylate, styrene, and acrylonitrile.

7. The magnetic carrier according to claim 6,
wherein when a SP value of the second repeating structure is represented by $SPa_2$ and a SP value of the third repeating structure is represented by $SPb_3$, $SPa_2$ and $SPb_3$ satisfy $|SPa_2-SPb_3|\leq 2.5$.

8. A two-component developer comprising:
a toner; and
a magnetic carrier,
wherein the magnetic carrier includes a magnetic carrier particle including a magnetic core and a resin coating layer configured to coat a surface of the magnetic core,
wherein the resin coating layer contains a coating resin, the coating resin contains
a resin A having a fluorine polymer moiety, and
a resin B having a third repeating structure represented by formula (10):

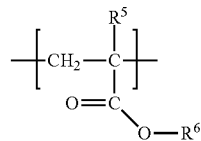

formula (10)

where $R^5$ represents hydrogen or a methyl group, and $R^6$ represents an alicyclic hydrocarbon group,
wherein a content ratio of the resin A in the coating resin is 3 mass % or more and 20 mass % or less, and
wherein the resin coating layer has an average thickness of 50 nm or more,
wherein when a concentration of a nitrogen atom, a concentration of a silicon atom, a concentration of a fluorine atom, a concentration of a carbon atom, a concentration of a titanium atom, a concentration of a strontium atom, a concentration of a tin atom, a concentration of an aluminum atom, and a concentration of an oxygen atom detected at a position at a depth of x nm from a surface of the magnetic carrier particle by X-ray photoelectron spectroscopy are represented by dN(x), dSi(x), dF(x), dC(x), dTi(x), dSr(x), dSn(x), dAl(x), and dO(x), respectively, a ratio F(x) (atomic %) of the fluorine atom represented by equation (A) satisfies formula (1) and formula (2), and wherein when x represents an integer of 0 or more and 20 or less, F (x) satisfies formula (3):

$$F(x)=dF(x)/[dN(x)+dSi(x)+dF(x)+dC(x)+dTi(x)+dSr(x)+dSn(x)+dAl(x)+dO(x)]\times 100 \quad (A)$$

$$5.0 \leq F(0) \leq 15 \quad (1)$$

$$F(20) \leq 5.0 \quad (2)$$

$$|F(x+1)-F(x)| \leq 7.5 \quad (3).$$

9. A developer for replenishment for use in an image-forming method including:
charging an electrostatic latent image-bearing member;
forming an electrostatic latent image on a surface of the electrostatic latent image-bearing member;
developing the electrostatic latent image with a two-component developer in a developing unit to form a toner image;
transferring the toner image onto a transfer material through or without through an intermediate transfer member; and
fixing the transferred toner image onto the transfer material,
the developer for replenishment being replenished into the developing unit in accordance with a reduction in toner concentration of the two-component developer in the developing unit,
the developer for replenishment comprising:
a magnetic carrier for replenishment; and
a toner,
wherein the magnetic carrier for replenishment is a magnetic carrier including a magnetic carrier particle including a magnetic core and a resin coating layer configured to coat a surface of the magnetic core,
wherein the resin coating layer contains a coating resin, the coating resin contains
a resin A having a fluorine polymer moiety, and
a resin B having a third repeating structure represented by formula (10):

formula (10)

where $R^5$ represents hydrogen or a methyl group, and $R^6$ represents an alicyclic hydrocarbon group,
wherein a content ratio of the resin A in the coating resin is 3 mass % or more and 20 mass % or less, and
wherein the resin coating layer has an average thickness of 50 nm or more,
wherein when a concentration of a nitrogen atom, a concentration of a silicon atom, a concentration of a fluorine atom, a concentration of a carbon atom, a concentration of a titanium atom, a concentration of a strontium atom, a concentration of a tin atom, a concentration of an aluminum atom, and a concentration of an oxygen atom detected at a position at a depth of x nm from a surface of the magnetic carrier particle by X-ray photoelectron spectroscopy are represented by dN(x), dSi(x), dF(x), dC(x), dTi(x), dSr(x), dSn(x), dAl(x), and dO(x), respectively, a ratio F(x) (atomic %) of the fluorine atom represented by equation (A) satisfies formula (1) and formula (2), and
wherein when x represents an integer of 0 or more and 20 or less, F (x) satisfies the following formula (3):

$$F(x)=dF(x)/[dN(x)+dSi(x)+dF(x)+dC(x)+dTi(x)+dSr(x)+dSn(x)+dAl(x)+dO(x)]\times 100 \quad (A)$$

$$5.0 \leq F(0) \leq 15 \quad (1)$$

$$F(20) \leq 5.0 \quad (2)$$

$$|F(x+1)-F(x)| \leq 7.5 \quad (3).$$

10. The magnetic carrier according to claim 1, wherein the magnetic core is a porous magnetic core whose holes are filled with a resin.

* * * * *